United States Patent
Sowden et al.

(10) Patent No.: US 10,896,478 B2
(45) Date of Patent: Jan. 19, 2021

(54) IMAGE GRID WITH SELECTIVELY PROMINENT IMAGES

(71) Applicant: Google LLC, Mountain View, CA (US)

(72) Inventors: Paul Sowden, Palo Alto, CA (US); Madhur Khandelwal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 16/200,262

(22) Filed: Nov. 26, 2018

(65) Prior Publication Data
US 2019/0164248 A1 May 30, 2019

Related U.S. Application Data

(63) Continuation of application No. 15/362,725, filed on Nov. 28, 2016, now Pat. No. 10,140,675.

(51) Int. Cl.
| | |
|---|---|
| *G06T 1/00* | (2006.01) |
| *G06F 3/0481* | (2013.01) |
| *G06F 3/0482* | (2013.01) |
| *H04N 1/00* | (2006.01) |

(52) U.S. Cl.
CPC .......... *G06T 1/0007* (2013.01); *G06F 3/0481* (2013.01); *G06F 3/0482* (2013.01); *H04N 1/00185* (2013.01)

(58) Field of Classification Search
CPC .... G06F 3/0481; G06F 17/212; G06F 17/245; G06T 1/0007
USPC ................................ 715/227, 243, 246, 247
See application file for complete search history.

(56) References Cited

U.S. PATENT DOCUMENTS

| | | | |
|---|---|---|---|
| 6,161,114 A | * | 12/2000 | King ....................... G06F 40/14 715/202 |
| 6,342,908 B1 | | 1/2002 | Bates et al. |
| 7,296,242 B2 | | 11/2007 | Agata et al. |
| D593,578 S | | 6/2009 | Ball et al. |
| D597,101 S | | 7/2009 | Chaudhri et al. |
| D614,640 S | | 4/2010 | Viegers et al. |

(Continued)

FOREIGN PATENT DOCUMENTS

| | | |
|---|---|---|
| EP | 2793115 | 10/2014 |
| WO | 2017/189047 | 11/2017 |

OTHER PUBLICATIONS

European Patent Office, Written Opinion of the International Preliminary Examining Authority for International Patent Application No. PCT/US2016/068437, dated Apr. 4, 2018, 8 pages.

(Continued)

*Primary Examiner* — Andrew R Dyer
(74) *Attorney, Agent, or Firm* — IP Spring

(57) ABSTRACT

Implementations relate to an image grid with selectively prominent images. In some implementations, a computer-implemented method includes identifying a plurality of images, where each image of the plurality of images has a respective importance score. A subset of the images is selected based at least in part on the respective importance score for each image. The method determines respective one or more cells in a grid for occupation by each of the images, where at least one image of the subset is placed in the grid such that it occupies at least two cells in the grid. The method causes the images to be displayed in a user interface on a display screen based on the grid.

19 Claims, 9 Drawing Sheets

(56) References Cited

U.S. PATENT DOCUMENTS

| | | |
|---|---|---|
| D632,700 S | 2/2011 | Brinda |
| D633,921 S | 3/2011 | Brinda |
| D634,753 S | 3/2011 | Loretan et al. |
| D637,604 S | 5/2011 | Brinda |
| D638,432 S | 5/2011 | Flik et al. |
| 7,949,948 B2* | 5/2011 | Schorr .................. G06F 40/106 715/243 |
| D641,372 S | 7/2011 | Gardner et al. |
| D643,851 S | 8/2011 | Arnold |
| D644,240 S | 8/2011 | Arnold |
| 8,160,309 B1 | 4/2012 | Tzur et al. |
| D658,673 S | 5/2012 | Velasco et al. |
| D663,315 S | 7/2012 | Cielak et al. |
| D663,741 S | 7/2012 | Cielak et al. |
| D663,743 S | 7/2012 | Tanghe et al. |
| D663,744 S | 7/2012 | Tanghe et al. |
| D664,550 S | 7/2012 | Lee et al. |
| D664,967 S | 8/2012 | Lee et al. |
| D664,968 S | 8/2012 | Lee et al. |
| D665,395 S | 8/2012 | Lee et al. |
| D668,261 S | 10/2012 | Arnold et al. |
| D673,168 S | 12/2012 | Frijlink et al. |
| 8,370,282 B1 | 2/2013 | Leung et al. |
| D687,446 S | 8/2013 | Arnold et al. |
| D692,448 S | 10/2013 | Jung et al. |
| D692,456 S | 10/2013 | Brinda et al. |
| D692,915 S | 11/2013 | Brinda et al. |
| D695,776 S | 12/2013 | Edwards et al. |
| D695,780 S | 12/2013 | Edwards et al. |
| D695,781 S | 12/2013 | Edwards et al. |
| 8,774,528 B2 | 7/2014 | Hibino et al. |
| D710,878 S | 8/2014 | Jung |
| D710,879 S | 8/2014 | Elston et al. |
| D711,908 S | 8/2014 | Lacour et al. |
| D715,832 S | 10/2014 | Lee |
| D716,337 S | 10/2014 | Lee |
| 9,116,648 B1 | 8/2015 | Funderburg et al. |
| D737,831 S | 9/2015 | Lee |
| D743,999 S | 11/2015 | Villamor et al. |
| D744,527 S | 12/2015 | Sanderson |
| D745,037 S | 12/2015 | Paolantonio et al. |
| D745,550 S | 12/2015 | Sanderson |
| D746,847 S | 1/2016 | Bauer |
| D748,120 S | 1/2016 | Bauer et al. |
| 9,269,323 B2 | 2/2016 | Edmiston et al. |
| D754,719 S | 4/2016 | Zha |
| D757,058 S | 5/2016 | Kai |
| D757,085 S | 5/2016 | Zukerman et al. |
| D762,671 S | 8/2016 | Chan et al. |
| D763,891 S | 8/2016 | Gomez et al. |
| D763,900 S | 8/2016 | Jeon et al. |
| D764,526 S | 8/2016 | Gomez et al. |
| D764,534 S | 8/2016 | Seo et al. |
| D765,136 S | 8/2016 | Lee et al. |
| D766,308 S | 9/2016 | Park et al. |
| D766,928 S | 9/2016 | Webster et al. |
| D766,968 S | 9/2016 | Gagnier |
| D766,970 S | 9/2016 | Gagnier |
| D768,158 S | 10/2016 | Lee et al. |
| D768,676 S | 10/2016 | Edwards et al. |
| D768,692 S | 10/2016 | Jahani et al. |
| D769,280 S | 10/2016 | Bae et al. |
| D769,306 S | 10/2016 | Bowen et al. |
| D770,472 S | 11/2016 | Lee et al. |
| D770,481 S | 11/2016 | Wielgosz |
| D770,499 S | 11/2016 | Rodriguez |
| D771,081 S | 11/2016 | Wielgosz |
| D772,919 S | 11/2016 | Jiang et al. |
| D774,065 S | 12/2016 | Tanaka |
| D776,692 S | 1/2017 | Armstrong |
| D777,752 S | 1/2017 | Heller et al. |
| D778,310 S | 2/2017 | Roberts et al. |
| D780,801 S | 3/2017 | Jann et al. |
| D781,336 S | 3/2017 | Butcher et al. |
| D781,915 S | 3/2017 | Vazquez et al. |
| 9,589,184 B1* | 3/2017 | Castillo ................. G06F 16/957 |
| D790,569 S | 6/2017 | Anzures et al. |
| D791,174 S | 7/2017 | Hart et al. |
| D809,003 S | 1/2018 | Sowden et al. |
| D820,868 S | 6/2018 | Lee |
| D821,439 S | 6/2018 | Sowden et al. |
| 10,002,641 B1* | 6/2018 | Chik .................... G06K 9/0055 |
| D823,337 S | 7/2018 | Shelksohn et al. |
| D825,594 S | 8/2018 | Wu et al. |
| D830,391 S | 10/2018 | Xie et al. |
| 10,222,960 B2 | 3/2019 | Sowden et al. |
| D844,659 S | 4/2019 | Ball et al. |
| D844,660 S | 4/2019 | Ball et al. |
| D849,026 S | 5/2019 | Anzures et al. |
| 10,409,895 B2* | 9/2019 | Hancock ............... G06F 3/0481 |
| D864,230 S | 10/2019 | Gupta |
| 2003/0085913 A1 | 5/2003 | Ahmad et al. |
| 2003/0117651 A1 | 6/2003 | Matraszek et al. |
| 2005/0071771 A1 | 3/2005 | Nagasawa et al. |
| 2006/0107204 A1* | 5/2006 | Epstein ................. G06F 40/106 715/243 |
| 2006/0120618 A1 | 6/2006 | Mizoguchi |
| 2006/0184966 A1 | 8/2006 | Hunleth et al. |
| 2007/0028270 A1 | 2/2007 | Ostojic et al. |
| 2008/0034317 A1 | 2/2008 | Fard et al. |
| 2008/0187248 A1 | 8/2008 | Ikeda et al. |
| 2009/0322915 A1 | 12/2009 | Cutler |
| 2010/0180222 A1 | 7/2010 | Otsuka et al. |
| 2010/0302249 A1 | 12/2010 | Fowler et al. |
| 2010/0313156 A1 | 12/2010 | Louch et al. |
| 2011/0126155 A1 | 5/2011 | Krishnaraj et al. |
| 2011/0305392 A1 | 12/2011 | Kapoor et al. |
| 2012/0076427 A1 | 3/2012 | Hibino et al. |
| 2012/0166986 A1 | 6/2012 | Trotta et al. |
| 2012/0206771 A1 | 8/2012 | Cok |
| 2012/0213404 A1* | 8/2012 | Steiner ................ G06F 16/5838 382/103 |
| 2012/0254791 A1 | 10/2012 | Jackson et al. |
| 2012/0299933 A1 | 11/2012 | Lau et al. |
| 2012/0308132 A1 | 12/2012 | Zimmer |
| 2013/0022294 A1* | 1/2013 | Hirayama ............... G06Q 30/02 382/305 |
| 2013/0055061 A1 | 2/2013 | Ashley-Rollman et al. |
| 2013/0239049 A1 | 9/2013 | Perrodin et al. |
| 2013/0328888 A1 | 12/2013 | Beaver et al. |
| 2014/0168272 A1 | 6/2014 | Chedeau et al. |
| 2014/0258903 A1 | 9/2014 | Kanbara et al. |
| 2014/0279261 A1* | 9/2014 | Krishna Kolluri ....... G06T 7/11 705/26.63 |
| 2014/0317565 A1 | 10/2014 | Bergmans |
| 2015/0117785 A1 | 4/2015 | Lee et al. |
| 2015/0134323 A1 | 5/2015 | Cuthbert et al. |
| 2015/0378556 A1 | 12/2015 | Ramanathan et al. |
| 2016/0019221 A1 | 1/2016 | Knoll et al. |
| 2016/0054845 A1* | 2/2016 | Takahashi ........... G06F 3/04817 345/173 |
| 2016/0063009 A1* | 3/2016 | Charania ............... G06F 16/162 707/693 |
| 2016/0070953 A1 | 3/2016 | Yamaji |
| 2016/0139761 A1 | 5/2016 | Grosz et al. |
| 2016/0248993 A1 | 8/2016 | Sato |
| 2016/0275686 A1* | 9/2016 | Zach .................... G06K 9/6201 |
| 2016/0350598 A1* | 12/2016 | Yamaji ............... G06K 9/00221 |
| 2017/0024388 A1* | 1/2017 | Bentley ............... G06F 16/9537 |
| 2017/0091973 A1 | 3/2017 | Lee et al. |
| 2017/0116466 A1* | 4/2017 | Resnick ................ A61K 47/26 |
| 2017/0301126 A1 | 10/2017 | Habib et al. |
| 2018/0068173 A1* | 3/2018 | Kolleri .................... G06F 16/29 |
| 2018/0121733 A1* | 5/2018 | Joshi ................... G06K 9/00744 |
| 2018/0121953 A1* | 5/2018 | Zhang .................... G06N 5/003 |

OTHER PUBLICATIONS

European Patent Office, Communication Pursuant to Rules 161(1) and 162 EPC for European Patent Application No. 16828847.0, dated Dec. 4, 2018, 3 pages.

(56) References Cited

OTHER PUBLICATIONS

European Patent Office, Written Opinion of the International Preliminary Examining Authority for International Patent Application No. PCT/US2016/068437, dated Jul. 11, 2018, 8 pages.
European Patent Office, International Search Report for International Patent Application No. PCT/US2016/068437, dated Mar. 21, 2017, 5 pages.
European Patent Office, Written Opinion for International Patent Application No. PCT/US2016/068437, dated Mar. 21, 2017, 9 pages.
International Bureau of WIPO, International Preliminary Report on Patentability for International Patent Application No. PCT/US2016/068437, dated Oct. 30, 2018, 8 pages.
Martinrgb, "Photo Edit", Posted at dribble, posting date Sep. 15, 2015 [online, site visited Apr. 14, 2017]; URL: https://dribble.com/shots/2245937-Photo-Edit, Sep. 15, 2015, 2 pages.
Maxromanchuk, "Photo Album", Posted at dribble, posting date Feb. 5, 2015 [online, site visited Apr. 14, 2017]; URL: https://dribble.com/shots/1917342-Photo-Album, Feb. 5, 2015, 2 pages.
Quevedo, "Grid Responsive Image Gallery", Posted at YouTube, posting date Nov. 8, 2013 [online; site visited Apr. 14, 2017]; URL: https://www.youtube.com/watch?v=yh_IIYtQHjE, Nov. 8, 2013, 2 pages.
Sumi, "Grid Diary with Photo", Posted at dribble, posting date Jul. 28, 2014 [online, site visited Apr. 14, 2017]; URL: https://dribble.com/shots/1659823-Grid-Diary-with-Photo, Jul. 28, 2014, 3 pages.
USPTO, Non-final Office Action for U.S. Appl. No. 29/562,553, dated Apr. 21, 2017, 15 pages.
USPTO, Non-final Office Action for U.S. Appl. No. 29/562,554, dated Apr. 25, 2017, 15 pages.
USPTO, First Action Interview, Pre-Interview Communication for U.S. Appl. No. 15/139,259, dated Aug. 10, 2018, 5 pages.
USPTO, Notice of Allowance for U.S. Appl. No. 29/562,553, dated Feb. 28, 2018, 9 pages.
USPTO, First Action Interview, Pre-Interview Communication for U.S. Appl. No. 15/362,725, dated Jan. 23, 2018, 28 pages.
USPTO, Notice of Allowance for U.S. Appl. No. 15/362,725, dated Jul. 25, 2018, 14 pages.
USPTO, First Action Interview, Office Action Summary for U.S. Appl. No. 15/362,725, dated Mar. 19, 2018, 6 pages.
USPTO, Notice of Allowance for U.S. Appl. No. 15/139,259, dated Oct. 17, 2018, 16 pages.
USPTO, Restriction Requirement for U.S. Appl. No. 29/562,553, dated Sep. 26, 2017, 6 pages.
USPTO, Notice of Allowance for U.S. Appl. No. 29/562,554, dated Sep. 27, 2017, 7 pages.
EPO, Communication Pursuant to Article 94(3) EPC for European Patent Application No. 16828847.0, dated Apr. 1, 2020, 8 pages.
Hein, "A Visual Walkthrough of iOS 7 with GIFs", Retrieved from Internet: https://www.cultofmac.com/231612/all-the-best-ios-7-gifs, Sep. 18, 2013, 1 page.
Raphael, "16 cool things to try with the new Google Photos", Retrieved from Internet: https://www.computerworld.com/article/2929593/new-google-photos-app.html, Jun. 2, 2015, 1 pages.
USPTO, Notice of Allowance for U.S. Appl. No. 29/654,380, dated Apr. 1, 2020, 8 pages.
USPTO, Notice of Allowance for U.S. Appl. No. 29/654,376, dated Apr. 1, 2020, 8 pages.
USPTO, Notice of Allowance for U.S. Appl. No. 29/654,377, dated Apr. 1, 2020, 8 pages.
USPTO, Non-final Office Action for U.S. Appl. No. 29/654,379, dated Mar. 24, 2020, 6 pages.
USPTO, Notice of Allowance for U.S. Appl. No. 16/287,817, dated Jan. 16, 2020, 17 pages.
"How to implement interactive animations with Swift's UIViewPropertyAnimator", Retrieved from Internet: https://www.freecodecamp.org/news/interactive-animations-with-swifts-uiviewpropertyanimator-284262530a0a (retrieved on Nov. 6, 2019), Aug. 25, 2018, 3 pages.
"Instagram: Entirely New Look", Retrieved from Internet: https://abduzeedo.com/instragram-entirely-new-look (retrieved on Nov. 7, 2019), May 11, 2016, 2 pages.
"Putting a UICollectionView in a UITableViewCell in Swift", Retrieved from Internet: https://ashfurrow.com/blog/putting-a-uicollectionview-in-a-uitableviewcell-in-swift (retrieved on Nov. 7, 2019), Nov. 3, 2015, 3 pages.
Chen, "iOS Tutorial: Want you Swift app to scroll in two directions, like Netflix? Here's how.", Retrieved from Internet: https://www.thorntech.com/2015/08/want-your-swift-app-to-scroll-in-two-directions-like-netflix-heres-how (retrieved on Nov. 7, 2019), Aug. 6, 2015, 3 pages.
Engin, "Animating Collection Views", Retrieved from Internet: https://www.objc.io/issues/12-animations/collectionview-animations (retrieved on Nov. 6, 2019), May 2014, 2 pages.
Loren, "Instagram Year in Review: Top Trends from 2016", Retrieved from Internet: https://later.com/blog/instagram-year-in-review-2016 (retrieved on Nov. 7, 2019), Dec. 15, 2016, 2 pages.
USPTO, Non-final Office Action for U.S. Appl. No. 29/654,376, dated Nov. 13, 2019, 6 pages.
USPTO, Non-final Office Action for U.S. Appl. No. 29/654,377, dated Nov. 13, 2019, 8 pages.
USPTO, Non-final Office Action for U.S. Appl. No. 29/654,380, dated Nov. 13, 2019, 8 pages.
USPTO, Non-final Office Action for U.S. Appl. No. 29/654,379, dated Nov. 19, 2019, 6 pages.
USPTO, First Action Interview, Pre-Interview Communication for U.S. Appl. No. 16/287,817, dated Oct. 18, 2019, 4 pages.
The Rip-offs & Making Our Original Game, Retrieved from Internet: http://asherv.com/threes/threemails, Apr. 5, 2014, 3 pages.
Bobrova, "Cloud Mail.Ru in Material Design", Retrieved from Internet: https://dribble.com/shots/2398740-Cloud-Mail-Ru-in-Material-Design, Dec. 10, 2015, 2 pages.
USPTO, Notice of Allowance for U.S. Appl. No. 29/654,379, dated Jul. 6, 2020, 7 pages.

* cited by examiner

IMAGE GRID WITH SELECTIVELY PROMINENT IMAGES

CROSS-REFERENCE TO RELATED APPLICATIONS

This application is a continuation of U.S. patent application Ser. No. 15/362,725, filed Nov. 28, 2016 and titled IMAGE GRID WITH SELECTIVELY PROMINENT IMAGES, the contents of which are incorporated herein by reference in their entirety.

BACKGROUND

The popularity and convenience of digital camera devices as well as the widespread of use of Internet communications have caused user-produced visual content such as digital photographs and videos to become ubiquitous. For example, large numbers of images of various types can be captured, stored, and displayed by user devices. Some devices allow a user's images to be displayed in a layout in which the images are positioned adjacent to each other. In cases where only a subset of the images can be displayed at once, the user may scroll a displayed view to different portions of the layout to view additional images.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to an image grid with selectively prominent images. In some implementations, a computer-implemented method includes identifying a plurality of images, where each image of the plurality of images has a respective importance score; selecting a subset of the plurality of images based at least in part on the respective importance score for each image; determining respective one or more cells of a plurality of cells in a grid for occupation by each of the plurality of images, where at least one image of the subset is placed in the grid such that it occupies at least two cells in the grid; and causing the plurality of images to be displayed in a user interface on a display screen based on the grid.

Various implementations and examples of the method are described. For example, in some implementations, determining the respective one or more cells in the grid includes, for each given image of the at least one image of the subset occupying at least two cells in the grid: determining an available cell in the grid, determining one or more subsequent cells in the grid, where each subsequent cell is adjacent to at least one cell of the available cell and the one or more subsequent cells, and placing the given image across the available cell and the one or more subsequent cells. In some implementations, determining the one or more subsequent cells is based on an aspect ratio of the given image. For example, a number and spatial configuration of the available cell and the one or more subsequent cells can be determined based on the aspect ratio of the given image. In some examples, the available cell is a first empty cell in a right-then-down order in the grid. In some implementations, the at least one image of the subset placed in the grid includes multiple images of the subset placed in the grid, each of the multiple images occupying at least two cells in the grid. In some implementations, determining the respective one or more cells in the grid for occupation by each of the plurality of images includes rearranging one or more previously-placed images in the grid after placement of the at least one image that occupies at least two cells in the grid, where the rearranging includes placing the one or more previously-placed images in a grid direction and in a sort order in cells of the grid available after the placement of the at least one image that occupies at least two cells in the grid.

The method includes, in some implementations, determining whether the available cell is adjacent to a previously-placed image that occupies at least two cells in the grid, where, in response to determining that the available cell is not adjacent to such a previously-placed image, the determining of one or more subsequent cells in the grid and the placing the given image across the available cell and the one or more subsequent cells is performed, and, in response to determining that the available cell is adjacent to such a previously-placed image, the given image is placed in the next available cell. In some implementations, the method includes cropping one or more given images of the plurality of images, where the cropping of each given image is based on a number of the respective one or more cells in the grid occupied by the given image. In some implementations, the respective importance score for each image is based upon one or more visual characteristics of the image and/or prior user interaction with the image, and selecting the subset of the plurality of images includes determining, for each image of the plurality of images, whether the respective importance score of the image meets an importance threshold, and, if the importance threshold is met, the image is added to the subset. In some implementations, selecting the subset of the plurality of images further includes determining whether a count of images in the subset divided by a count of the plurality of images meets a prominence threshold, and, in response the prominence threshold being met, removing one or more images from the subset. In some implementations, the method includes programmatically analyzing the subset of images to determine at least one image of the subset that meets a similarity threshold with reference to other images of the subset, and, in response to the similarity threshold being met, removing the at least one image from the subset.

In some implementations, a device includes a memory and at least one processor configured to access the memory and perform operations including identifying a plurality of images, where each image of the plurality of images has a respective importance score; selecting a subset of the plurality of images based at least in part on the respective importance score for each image; determining a display layout for the plurality of images, where the display layout includes a plurality of cells arranged in a grid and where at least one image of the subset of images occupies at least two cells in the display layout; and causing the plurality of images to be displayed in a user interface on a display device based on the display layout.

Various implementations and examples of the device are described. For example, in some implementations, the processor is configured to determine the display layout including inserting the plurality of images in the grid, where the inserting comprises, for one or more of the plurality of images: selecting a particular image from the plurality of images; selecting a particular cell from the plurality of cells in the grid; determining if the particular image is in the subset of images; in response to determining that the particular image is not in the subset of images, placing the particular image in the particular cell; and in response to determining that the particular image is in the subset of images, determining one or more subsequent cells from the plurality of cells in the grid to place the image; and placing the particular image such that the particular image occupies the particular cell and the one or more subsequent cells. In response to determining that the particular image is in the subset of images, the processor is further configured, in some implementations, to perform operations including determining whether there is at least one cell adjacent to the particular cell that includes a previously-placed image that occupies more than one cell in the display layout; in response to determining such adjacency, placing the particular image in the particular cell; and in response to determining that there is no cell adjacent to the particular cell that includes the previously-placed image, performing the placing of the particular image to occupy the particular cell and the one or more subsequent cells.

In some implementations, in response to determining that the particular image is in the subset of images, the processor is further configured to perform operations including determining an aspect ratio of the particular image, where the determining the one or more subsequent cells is based at least in part on the aspect ratio. The operation of determining the one or more subsequent cells, in some implementations, further includes determining a type of the image, where the type is one of: square, landscape image, portrait image, horizontal panorama, and vertical panorama. If the type of the image is square, cells are selected adjacent to the next available cell in a m×n pattern, where m is equal to n; if the type of the image is landscape or a horizontal panorama, cells are selected adjacent to the next available cell in a m×n pattern, where m is greater than n; and if the type of the image is portrait or vertical panorama, cells are selected adjacent to the next available cell in a m×n pattern, where m is less than n, where m refers to a number of columns in a horizontal direction along the grid and n refers to a number of rows in a vertical direction along the grid.

The operation of selecting the particular image is performed, in some implementations, in a sort order determined based on a sort parameter, and the at least one processor is further configured to perform operations comprising, prior to determining the display layout, sorting the plurality of images in the sort order based on the sort parameter. In some implementations, the grid includes a plurality of columns and each of the plurality of cells can be square-shaped, and the processor is further configured to perform operations comprising, prior to causing the plurality of images to be displayed, cropping the plurality of images. In some implementations, the cropping includes, for each image of the plurality of images: cropping the image to a square shape if the image is to be placed in the particular cell; and cropping the image based on an aspect ratio of the image if the image is to be placed in the particular cell and the one or more subsequent cells. In some implementations, the respective importance score for each image is based upon one or more visual characteristics of the image, a number of faces in the image, a view count for the image, a share count for the image, an edit history for the image, whether a face over a threshold size appears in the image, whether a recognized face appears in the image, a location score for the image, and/or a number of near similar images in the plurality of images.

In some implementations, a non-transitory computer readable medium has stored thereon software instructions that, when executed by a processor, cause the processor to perform operations. The operations include identifying a plurality of images, where each image of the plurality of images has a respective importance score; selecting a subset of the plurality of images based at least in part on the respective importance score for each image; determining respective one or more cells of a plurality of cells in a grid for occupation by each of the plurality of images, where at least one image of the subset is placed in the grid such that it occupies at least two cells in the grid, where the plurality of cells in the grid are in arranged in a plurality of rows and columns. Determining the respective one or more cells in the grid for each of the plurality of images includes, for a given image in the plurality of images: determining a next available cell in the grid; placing the given image, and causing the plurality of images to be displayed in a user interface on a display screen based on the grid. If the given image is not in the subset, the given image is placed in the next available cell; and, if the given image is in the subset, one or more subsequent cells are determined in the grid and the given image is placed across the next available cell and the one or more subsequent cells.

DETAILED DESCRIPTION

Figure 1:
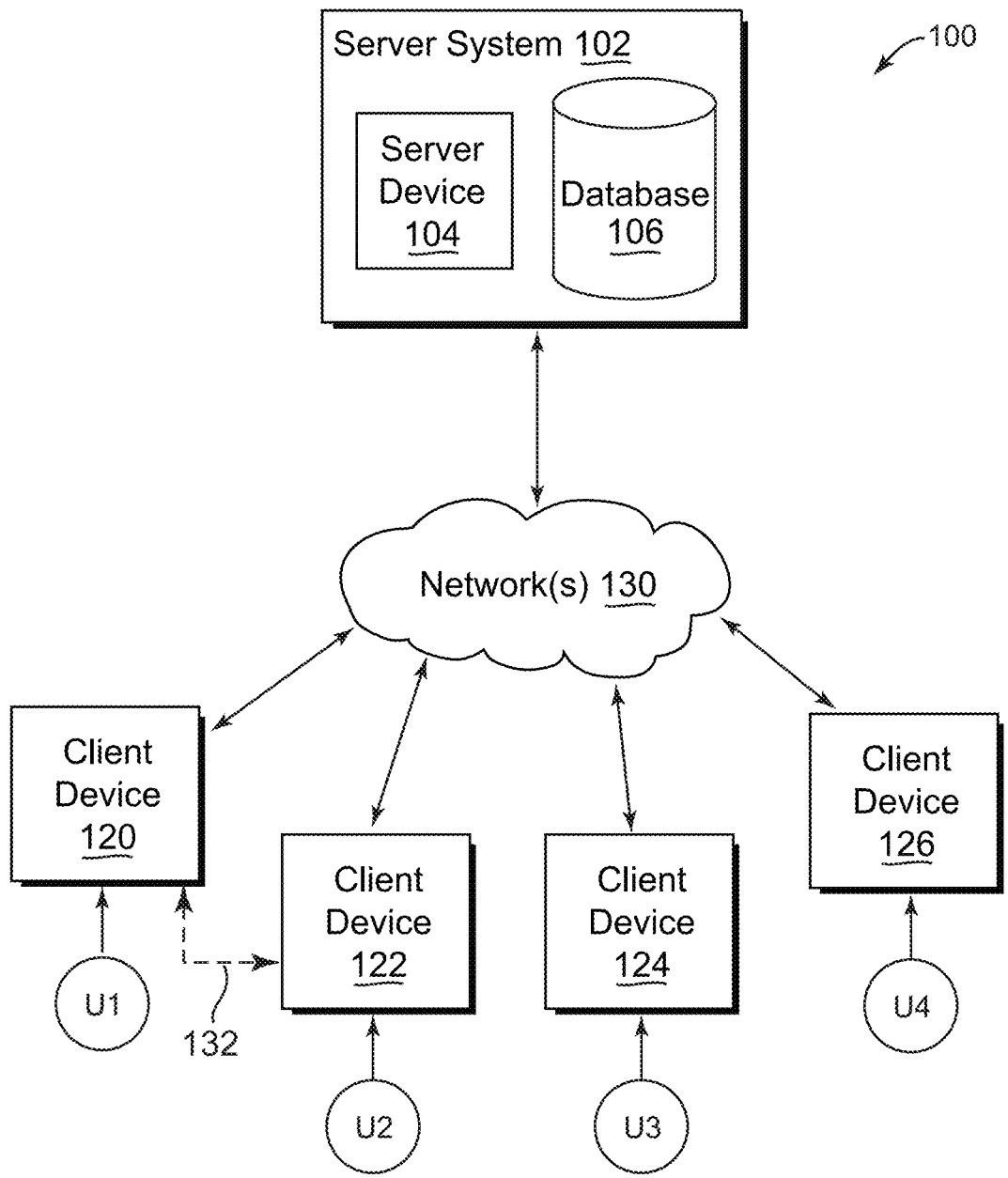
FIG. 1 is a block diagram of example systems and a network environment which may be used for one or more implementations described herein.

Implementations of the present application relate to an image grid with selectively prominent images. In some implementations, a computer-implemented method includes identifying a plurality of images, where each image has a respective importance score based on any of a variety of factors (e.g., visual or content characteristics and quality, prior user interaction with the image, existence of a number of similar images, etc.). A subset of the images is selected based at least in part on the respective importance score for each image, e.g., creating a subset of images that may be highlighted. One or more cells in a grid are determined for placement of each of the images. At least one image of the subset is placed in the grid such that it occupies at least two cells in the grid, e.g., as a highlighted image. The images are caused to be displayed in a user interface on a display screen based on the grid.

Various additional features are described. For example, for qualifying images of the subset, an available cell and one or more subsequent cells are determined in the grid, and the image is placed across these cells. The number and configuration of the subsequent cells can be determined based on the aspect ratio of the image, e.g., a portrait image can be provided with more cells in the vertical direction while a landscape image can be provided with more cells in the horizontal direction. The images can be displayed in the grid in a sort order that is determined based on particular criteria, e.g., timestamps of the images, subject matter of images, etc. A number of columns can be determined for the grid based on a size and a display orientation of the display screen. In some implementations, previously placed images can be rearranged in the grid after placing a highlighted image so that the sort order and a grid direction (e.g., right-then-down) can be maintained. Various features can include determining if a placed highlighted image will be adjacent or close to another highlighted image in the displayed layout, and suppressing the highlighting if such adjacency or nearness occurs, thus maintaining distinctiveness and prominence of highlighted images. Features include removing one or more images from highlighted status if one or more particular conditions are met that, e.g., may cause highlighted images to seem less distinctive. For example, one condition can include a ratio of highlighted images to total number of displayed images being too large (e.g., over a threshold). Another condition can include one or more images meeting a similarity threshold with reference to each other.

One or more features described herein allow images to be displayed in a layout in which one or more images are displayed more prominently as highlighted images. Images to be highlighted can be determined automatically (without user input) based on various image characteristics, and/or can be selected by the user. Highlighted images can be advantageously presented at an increased size that conforms to a grid of cells, so that the highlighted images can be cleanly displayed among non-highlighted images in the displayed layout. Furthermore, the cells of the highlighted image can be selected to present an aspect ratio in the grid that is similar to the actual aspect ratio of the image, thus allowing less image area to be cropped to fit in the displayed layout and providing a more complete view of images that may otherwise be cropped to a greater extent, e.g., if placed in a single grid cell. Various features allow a system to maintain the visual distinctiveness and prominence of highlighted images in a image layout that displays multiple images, e.g., by keeping the number of highlighted images low relative to the total number of images, by maintaining a minimum distance between highlighted images, by varying the positions (e.g., columns) of highlighted images in the grid, etc.

Features described herein permit presentation of image in a more clear and distinctive manner. For example, a user can more easily find a particular image in a large set of images. A user can more easily remember a location of a particular image within a long, scrolling layout of images by remembering highlighted images at or near the image location (e.g., the user may remember that other images were taken in proximity in time or space to a remembered highlighted image and will be positioned close to that highlighted image). Another advantage of one or more implementations is that a regularity of a grid is maintained for the display of larger, highlighted images and other, smaller-sized images. Furthermore, some implementations do not introduce random or empty spaces within the grid. Such features may allow easier viewing and scanning of images by users. In addition, in some implementations, images positioned in the layout can be positioned in a predictable manner, e.g., according to a predictable sort order, making it easier for a user to skip ahead to later images without the need to load all images for viewing.

Additionally, systems and methods provided herein overcome deficiencies of conventional systems and methods to display images in a display layout, e.g., based on a grid. For example, some conventional image layout techniques display images in a fixed size grid, e.g., a grid of square cells, a grid of rectangular cells, etc., without regard to the image content or aspect ratio. Some conventional image layout techniques display images in a grid that displays images based on templates that have fixed aspect ratios that are independent of the image content or importance of an image to a user. Some conventional image layout techniques display images at different sizes, e.g., in an irregular grid, but without regard to the image content or importance of an image to a user. Some conventional image layout techniques highlight images based on a fixed pattern, e.g., highlight first photo in a section of the layout, with a fixed larger size for the highlighted image, irrespective of image content or importance to a user.

Example systems and methods described herein overcome the deficiencies of conventional image layout techniques by providing a flexible and responsive layout technique. Particular implementations may realize one or more of the following advantages. A technical problem of conventional image layout techniques is that such techniques do not account for image content or importance of an image to a user when arranging images in a display layout. In contrast, systems and methods described herein may select images to highlight in a display layout based on one or more parameters that are determined based on image content and importance to a user. Further, conventional techniques do not adjust to individual user's image libraries (e.g., quality of images within a user's image library) when selecting images to highlight. An advantage of the techniques described herein is that the techniques produce image display layouts that are customized for each user.

Further, another technical problem of conventional techniques is that such techniques cannot automatically adapt to different sizes and orientations of display screens on which images may be displayed in an image layout. An advantage of techniques of this disclosure is providing image layouts that are suitable for any display screen by selecting important images and performing image layout based on the size and orientation of the display screen. For example, produced display layouts can be easily scaled to other form factors and display view sizes. Another technical advantage of the techniques of this disclosure is that the techniques can produce display layouts for any number of images.

Further, another technical problem of conventional techniques is that such techniques cannot highlight images that have arbitrary aspect ratios, e.g., panoramic images. An advantage of techniques of this disclosure is that the techniques can highlight images of any aspect ratios, allowing a greater variety of image types to be highlighted. Furthermore, some conventional techniques may display images in widely varying sizes. An advantage of techniques of this disclosure is that the techniques can highlight images such that the relative sizes of highlighted and non-highlighted images in a consistent manner, allowing faster and easier scans of images by a user.

Described features can provide clarity and efficiency in presentation of a user's images. Described features can allow a device to display large image collections with important images presented prominently, allowing a user to find and view particular images more quickly and easily. Described techniques allow reduction of time-consuming and complex manipulation of a display interface by user compared to conventional display techniques. Consequently, a technical effect of one or more described implementations is that display of images is achieved with less computational time and resources expended to obtain results. For example, a technical effect of described features is a reduction in the consumption of system processing resources utilized to display images (e.g., processor resources, memory, power, etc.) than in a system that does not provide one or more of the described features.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service, or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

A user interface can enable display of images, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen(s), projector, etc. In some implementations, application programs running on a server system can communicate with a client device to receive user input at the client device and to output data such as visual data, audio data, etc. at the client device.

In some implementations, server system 102 and/or one or more client devices 120-126 can provide a display layout program. The display layout program may allow a system (e.g., client device or server device) to provide image layouts (e.g., based on a grid) that include highlighted images, some examples of which are described herein. The display layout program can provide associated user interface(s) that are displayed on a display device associated with the server system or client device. The user interface may provide various options to a user to cause the display of images to view, select images, etc. Other applications can also be used with one or more features described herein, such as browsers, email applications, communication applications, etc.

Various implementations of features described herein can use any type of system and/or service. For example, social networking services, image collection and sharing services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2A:
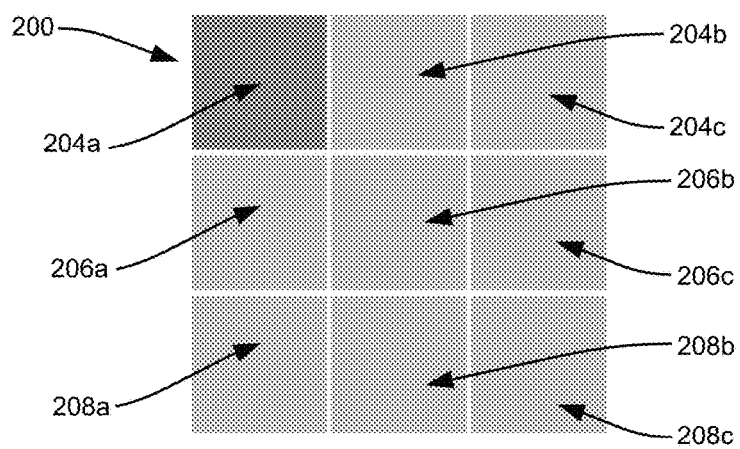
FIG. 2A illustrates a plurality of images arranged in a display layout according to a prior art technique.

FIG. 2A illustrates a plurality of images arranged in a display layout according to a prior art technique. As shown in FIG. 2A, the display layout includes a 3×3 configuration of images, e.g., 9 images (204a, 204b, 204c, 206a, 206b, 206c, 208a, 208b, and 208c) arranged in individual cells of a grid 200. While FIG. 2A shows a grid of three columns and three rows in a 3×3 configuration of cells, grids of any numbers of rows and columns are possible. Each of the images is in a square-shaped cell of the grid. As can be seen from FIG. 2A, no individual image stands out from the rest of the images based on its size, since each image is displayed at a same size. For example, image 204a, shown in a darker shade than the rest of the images in FIG. 2A, may be an important image to a user, e.g., an image that a user has marked as favorite, an image that has high visual quality, an image that depicts a user's spouse smiling, etc., but does not stand out from the rest of the images. A user viewing this display layout may not easily be able to discern that image 204a is an important image. Further, if the display layout includes additional images, e.g., in more rows or columns that may be viewed by scrolling, it may not be easy for a user to discern or recognize particular positions in the overall display layout. This disclosure describes techniques to selectively highlight, or display with greater prominence, images that may be deemed to be important.

FIGS. 2B-2E are diagrammatic illustrations showing some implementations of a plurality of images arranged in a display layout and including one or more features described herein. Each of FIGS. 2B-2E show a display layout where a grid of cells includes 3 columns and 3 rows. In this example, each cell of the grid is the same size, e.g., square-shaped. Images may occupy the cells of the grid, where each image may occupy one or more cells. In each of FIGS. 2B-2E, a particular image is highlighted, e.g., is considered a highlighted image that can be displayed in a distinctive manner to indicate that it has been determined to have greater importance than other images not so highlighted. In the examples of FIGS. 2B-2E, the highlighted image is highlighted by displaying the image across two or more cells of the grid, e.g., displayed at a size to cover two or more cells so that the image is a larger size than other, non-highlighted images in the grid that, e.g., are each displayed in one cell of the grid.

Figure 2B:
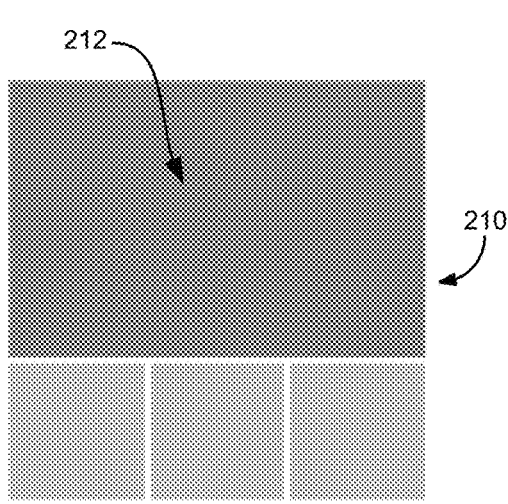
FIGS. 2B-2E illustrate a plurality of images arranged in a display layout, according to some implementations.

For example, FIG. 2B shows a grid 210 in which the entire top two rows of the grid are occupied by image 212 (shown in darker shade in FIG. 2B). In some examples, image 212 may be a landscape image, e.g., an image that has an aspect ratio such that a horizontal dimension of the image is larger than a vertical dimension (e.g., an aspect ratio of 4:3, 5:3, 16:9, etc.). Image 212 may be designated as a highlight image based on a variety of parameters, as explained in detail below with reference to FIG. 4. By displaying image 212 at a larger size so that it covers 3 columns and 2 rows of grid 210 in a 3×2 configuration, image 212 is highlighted such that a user viewing a display layout based on the image grid 210 can view image 212 at a larger size relative to other images that are not highlighted (e.g., other images not determined to be important by a user or system). Further, the 3×2 configuration may be selected as a match to the original landscape aspect ratio of the image, or is selected as similar to the original landscape aspect ratio, thereby preserving a substantial portion of the image information while still fitting the grid 210.

Figure 2C:
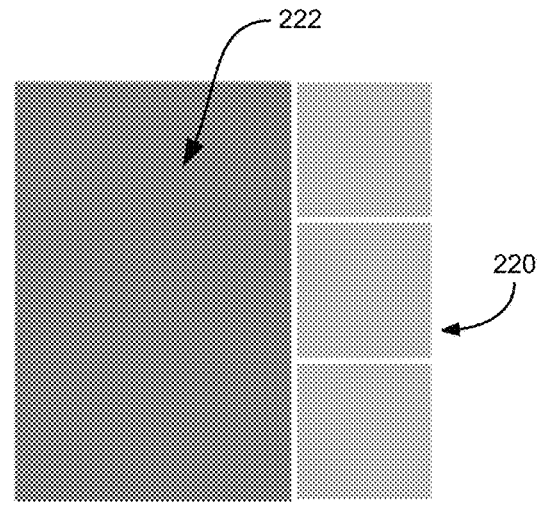

In another example, FIG. 2C shows a grid 220 in which the two leftmost columns of the grid are occupied by image 222 (shown in darker shade in FIG. 2C). For example, image 222 may be a portrait image, e.g., an image that has an aspect ratio such that a vertical dimension of the image is larger than a horizontal dimension (e.g., an aspect ratio of 3:4, 3:5, 9:16, etc.). By displaying image 222 in a size such that it covers 2 columns and 3 rows of grid 220 in a 2×3 configuration, image 222 is highlighted such that a user viewing a display layout based on the image grid 220 can view image 222 at a larger size relative to other images that are not highlighted. Further, the 2×3 configuration may be selected as a match (or as similar to) the aspect ratio of the image, thereby preserving a substantial portion of the image information while still fitting the grid 220.

Figure 2D:
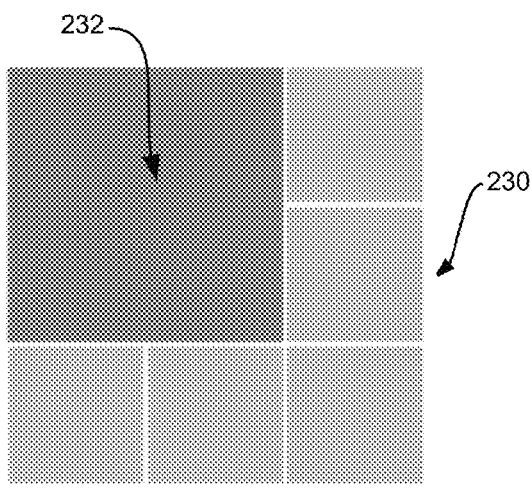

In another example, FIG. 2D shows a grid 230 in which the two leftmost columns of the grid are occupied by image 232 (shown in darker shade in FIG. 2D). For example, image 232 may be a square image, e.g., an image that has an aspect ratio such that a vertical dimension of the image is equal to or very close to a horizontal dimension (e.g., an aspect ratio of 1:1). By displaying image 232 in a size such that it covers 2 columns and 2 rows of grid 230 in a 2×2 configuration, image 232 is highlighted such that a user viewing a display layout based on the image grid 230 can view image 232 at a larger size relative to other images that are not highlighted. Further, the 2×2 configuration may be selected as a match (or as similar to) the aspect ratio of the image, thereby preserving a substantial portion of the image information while still fitting the grid 230, and also displaying other images in the grid.

Figure 2E:
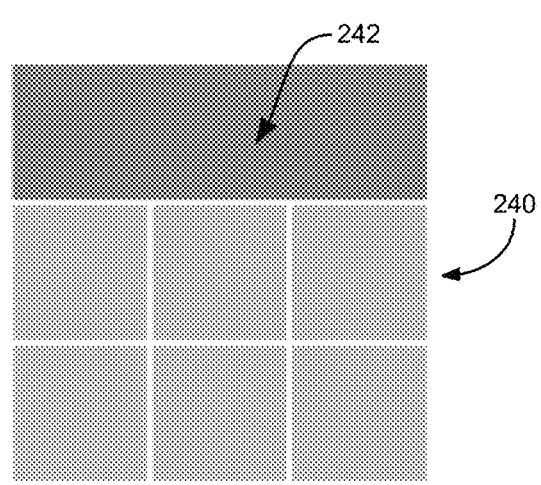

In another example, FIG. 2E shows a grid 240 in which the top row of the grid is occupied by image 242 (shown in darker shade in FIG. 2E). For example, image 242 may be a horizontal panoramic image (or horizontal panorama), e.g., an image that has an aspect ratio such that a horizontal dimension of the image is substantially larger than a vertical dimension (e.g., an aspect ratio of 3:1, 4:1, etc.). By placing image 242 across 3 columns and 1 row of grid 240 in a 3×1 configuration, image 242 is highlighted such that a user viewing a display layout based on the image grid 240 can view image 242 at a larger size relative to other images that are not highlighted. Further, the 3×1 configuration may be selected as a match (or as similar to) the aspect ratio of the image, thereby preserving a substantial portion of the image information while still fitting the grid 240.

While FIGS. 2B-2E show examples of landscape, portrait, square, and horizontal panorama images, it may be understood that various implementations may include other types and/or aspect ratios of images, e.g., vertical panoramas, etc. Further, selection of the number of rows and columns of the grid across which an important image is displayed may be dependent on factors in addition to the aspect ratio, e.g., an orientation of the image, an overall size of the display layout (e.g., a 3×3 grid may be part of an overall display layout that has more than 3 columns, etc.). Various implementations may display images in a grid of cells having square or rectangular shapes as shown, and/or may display images in other shapes, e.g., circular, elliptical, hexagonal, or other regular or irregular shapes (e.g., shapes created by a user). For example, an image can be cropped to appear in the shapes presented in the grid. If displaying other types of shapes (non-square and non-rectangular) in the grid, a highlighted image can be displayed as a larger image in the other type of shape. In some implementations, each cell of the grid has the same size. In other implementations, one or more cells have a size different than other cells in the grid. In some implementations, a grid and/or images in the grid can be displayed as 3D objects, e.g., a 3D grid having a grid surface imposed on each side of a cube or other shape, displaying 3D image objects hovering or rotating above a planar grid surface, etc.

Further, in some implementations, images, such as images 204*a*-204*c*, 206*a*-206*c*, and 208*a*-208*c*, may be arranged in a display layout in a sort order. For example, the sort order may be based on one or more sort parameters, such as a timestamp associated with each of the images (e.g., a creation timestamp, a last saved timestamp, a last viewed timestamp, etc.), a relevance of each image to a search query (e.g., when the display layout is used to display images in response to a search), content of the image, etc. In some implementations, where one or more images are highlighted, e.g., as shown in FIGS. 2B-2E, the display layout may generally preserve the sort order. For example, in FIG. 2B, image 212 may be displayed in the grid adjacent to (or near) other images based on the sort order.

Figure 3:
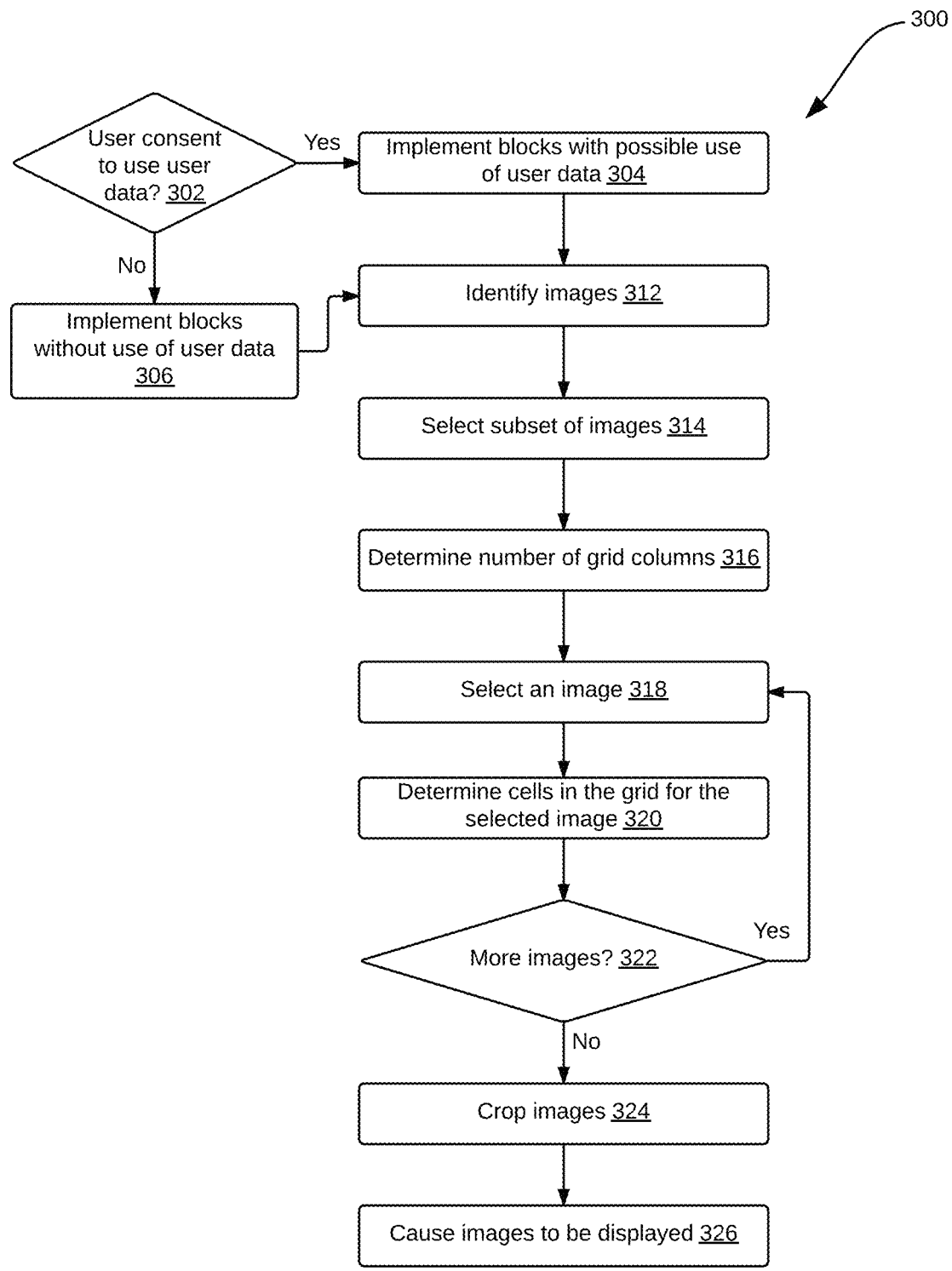
FIG. 3 is a flow diagram illustrating an example method 300 to provide display layouts that enable one or more images to be highlighted, according to some implementations.

FIG. 3 is a flow diagram illustrating an example method 300 to provide display layouts that enable one or more images to be highlighted, according to some implementations.

In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In described examples, the implementing system (e.g., user device) includes one or more digital hardware processors or processing circuitry ("processors"), and one or more storage devices (e.g., a database 106 or other storage). In some implementations, different components of one or more servers and/or clients can perform different blocks or other parts of the method 300.

Some implementations can initiate method 300 based on user input. A user may, for example, have selected the initiation of the method 300 from a displayed user interface. In some implementations, method 300 or portions thereof can be performed with guidance by the user via user input.

In some implementations, the method 300, or portions of the method, can be initiated automatically by a user device. For example, the method (or portions thereof) can be periodically performed, or performed based on the occurrence of one or more particular events or conditions. For example, such events or conditions can include a particular application being opened based on user input, obtaining one or more images that have been newly captured by, uploaded to, or otherwise accessible by a user device, a predetermined time period having expired since the last performance of method 300, and/or one or more other events or conditions occurring which can be specified in settings of a device implementing method 300. In some implementations, such conditions can be previously specified by a user in stored custom preferences of the user (accessible by a device or method with user consent). In some examples, a device (server or client) can perform the method 300 with access to a large collection of accessible images, e.g., a user's collection of images (if user consent is received). In another example, a camera, cell phone, tablet computer, wearable device, or other client device can capture one or more images and can perform the method 300. In addition, or alternatively, a client device can send one or more captured images to a server over a network, and the server can process the images using method 300.

In block 302, it is checked whether user consent (e.g., user permission) has been obtained to use user data in the implementation of method 300 (and/or methods 400 and 500, described below). For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations. If user consent has been obtained from the relevant users for which user data may be used in the method 300, then in block 304, it is determined that the blocks of the methods herein can be implemented with possible use of user data as described for those blocks, and the method continues to block 312. If user consent has not been obtained, it is determined in block 306 that blocks are to be implemented without use of user data, and the method continues to block 312. In some implementations, if user consent has not been obtained, the remainder of method 300 is not performed, and/or particular blocks needing the user data are not performed.

In block 312, a plurality of images are identified. The images are digital images including multiple pixels having pixel values that indicate the manner of display (e.g., indicating color, brightness, etc.). In some implementations, the images are associated with a user. In some examples, the plurality of images may include images captured by the user, e.g., with any of client devices 120-126. In additional examples, the plurality of images may include images uploaded by the user to storage, e.g., to an online image library of the user. In another example, the plurality of images may include images obtained by the user, e.g., by performing a scan (e.g., using an optical scanner device) of printed images. In another example, the plurality of images may include images received by the user, e.g., over a messaging service, via e-mail, etc. In some implementations, one or more of the images are provided from other sources, e.g., public databases, another entity's server, etc.

In some examples, the plurality of images may include respective metadata. For example, a client device that captures an image may include metadata such as capture date, capture time, capture location (geographic location), camera make/model, capture settings (e.g., aperture, shutter speed, ISO, focus mode, Exif data, etc.), a filename of the image, etc. In another example, an image may include user-generated metadata, e.g., tags associated with portions of the image, comments or other text associated the image, etc. In some implementations, the images are identified based on one or more metadata items. For example, the images can be identified based on timestamps associated with the images. In some examples, the plurality of images may be identified based on a timestamp associated with each image being within a particular time range (e.g., within the last hour, within the last day, within the last week, within the last month, etc.). In another example, the plurality of images can be identified based on a geographic location of capture of the images, e.g., the capture location being within a particular location range, e.g., within a particular city, within a particular country, near a landmark, etc. The method continues to block 314.

Figure 4:
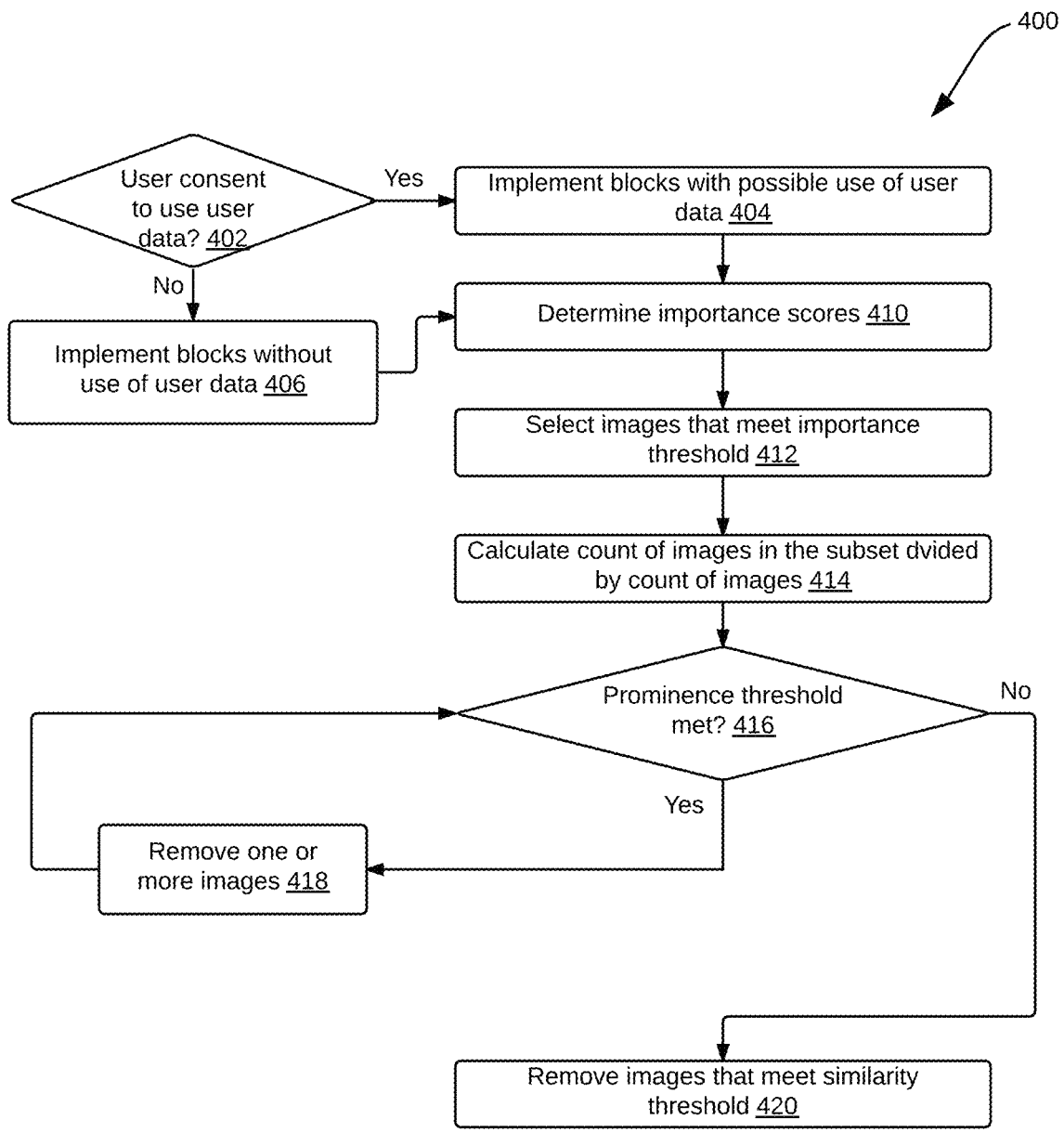
FIG. 4 is a flow diagram illustrating an example method 400 to select a subset of images that may be highlighted, according to some implementations.

In block 314, a subset of the identified images may be selected. For example, the subset of images may be selected such that the subset includes images that may be highlighted when displayed in a user interface based on one or more criteria, e.g., deemed important and highlighted in a user interface based on the criteria. FIG. 4 illustrates an example method to select the subset of images. The method continues to block 316.

In block 316, a number of grid columns in the display layout is determined. For example, to determine the number of grid columns, one or more parameters may be evaluated. The one or parameters may include, for example, a size of a display of a device. For example, the display can be a display screen or other display area or display view (e.g., within a user interface) on which the images are to be displayed using the display layout. In some examples, the size of the display may be determined in millimeters or inches. If the size of the display is large (e.g., 5 inches, 10 inches, etc.), a correspondingly larger number of columns may be used in the display layout. For example, a large display screen may be included in devices such as smartphones, tablet computers, laptop computers, desktop computers, etc. Conversely, if the size of the display screen is relatively small (e.g., 2 inches, 3 inches, etc.), a corresponding smaller number of columns may be used. For example, a small display screen may be included in devices such as smartwatches, fitness bands, neck-worn devices, small-screen cellular phones, other wearable devices, etc.

In some implementations, the display screen may be utilized in a different configuration, e.g., the display screen of a mobile device such as a smartphone, may be utilized in combination with a head-worn device (e.g., a virtual reality headset that includes lenses and other apparatus, e.g., that magnifies the image) in a virtual reality configuration. In these implementations, the size of the display screen may be relatively small, but a larger number of columns may be used upon detection that the display screen is used in combination with the head-worn device.

In some implementations, e.g., when the display screen is a device that supports multiple orientations (e.g., a portrait or vertical orientation, a landscape or horizontal orientation), an orientation of the device may also be evaluated to determine the number of columns. For example, if the device is currently oriented in physical space such that a horizontal dimension is larger than a vertical dimension, a larger number of columns may be used than when the device is oriented with the vertical dimension larger than the horizontal dimension.

In some implementations, additional parameters such as display resolution (e.g., in pixels per inch such as 200 PPI, 400 PPI; as a total count of pixels, e.g., 1024×768, 1200× 1080; as a resolution indicated in standards such as 780p, 1080p, 4K, 5K, etc.) may also be evaluated to determine the number of grid columns. A larger number of columns may be determined when the display resolution is higher. In some implementations, the number of columns may further be dependent on stored user preferences or user selections received in method 300. For example, the user may indicate a preference for a 5-column layout, a 6-column layout, etc. The method proceeds to block 318.

In some implementations, the grid that is used to determine a position for a highlighted image can be different than a grid used to display all of the plurality of images. For example, a grid used for a highlighted image can be a subset of a larger grid used to display images. In some examples, a highlighting grid (e.g., a 3×3 grid or 4×4 grid) can be used to position a highlighted image, where the highlighted image cannot be larger than the highlighting grid and the highlighting grid is positioned in the leftmost columns of a larger grid that is used to display images, regardless of how many columns are present in the larger grid. Highlighted images can thus be constrained within the columns of the highlighting grid on all devices, regardless of screen width or resolution.

In block 318, an image from the identified plurality of images is selected to determine its placement. In some implementations, the plurality of images may be sorted, e.g., in a particular sort order. For example, the sort order may be a chronological order based on a timestamp associated with each of the plurality of images. For example, the timestamp may correspond to a time at which the image was captured, a time at which the image was modified, a time at which the image was previously viewed, etc. In some implementations, the sort order may be a reverse chronological order, e.g., such that the images are arranged such that the most recent image is selected first, followed by subsequent images, based on the timestamp.

In some implementations, the sort order may be an order of relevance of the images. For example, when the images are identified in response to an image search query from the user, the images may be sorted in an order of decreasing relevance to the query. In some implementations, the sort order may be based on image metadata. For example, the identified images may be sorted based on location data, if the user consents to use of such data. For example, the identified images may be sorted based on distance from a particular location, e.g., a current location of the user, a home location of the user, etc. Timestamps and other types of data as described above can also be included in image metadata and used to sort the images.

In some implementations, if the user has permitted analysis of image content, the identified images may be analyzed to determine content, e.g., recognize human faces in the image, recognize landmarks, etc. Images may then be sorted based on image content, e.g., images that have recognized faces (e.g., of people within a user's social network, contact list, etc.) may appear earlier in the sort order than those with unrecognized faces or no faces. In some implementations, the images may be sorted based on a type of the image, e.g., a still image, an animated image (e.g., an animated GIF, a time-lapse image, etc.), a video, etc. In some implementations, the images may be sorted based on filenames. In some implementations, the images may not be sorted in any particular order, e.g., may be identified in a random order. In some implementations, the identified images may be sorted based on a combination of such parameters. For example, some implementations can determine a ranking of the images based on one or more of the above-described characteristics of the images (metadata, image content, etc.).

An image from the identified images in the sort order may be selected in block 318 for determination of placement of the image in the grid. For example, at a first execution of block 318, a first image in the sort order (or highest ranked image) may be selected. At subsequent executions of block 318, a next image in the sort order (or next highest rank) may be selected. In other implementations, an image from the identified images can be selected based on one or more other and/or additional criteria besides sort order, or in a random order or arbitrary order. The method continues to block 320.

Figure 5:
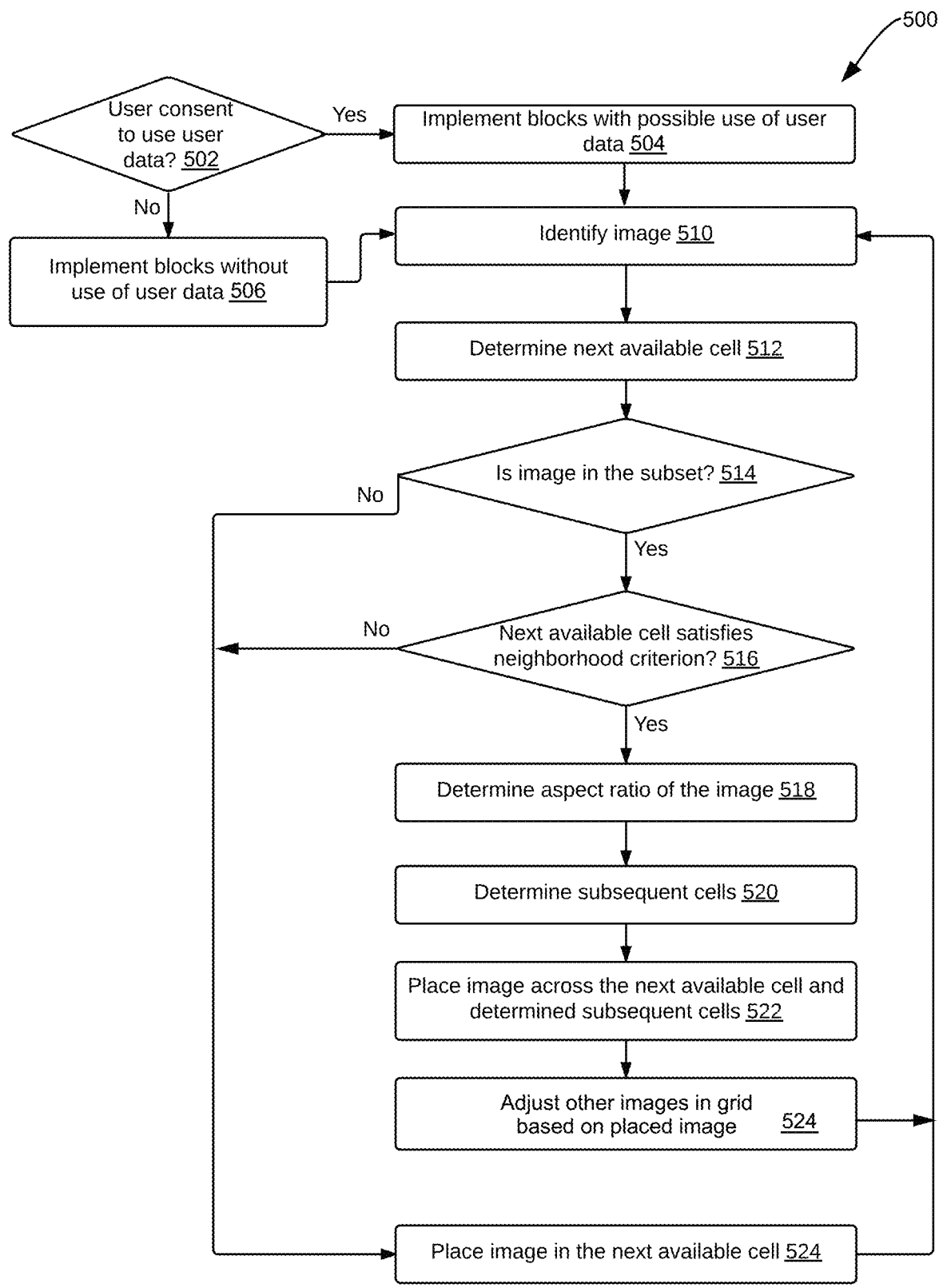
FIG. 5 is a flow diagram illustrating example method to determine cells in an image grid for an image, according to some implementations.

In block 320, one or more cells in the grid are determined for placement of the selected image. In various cases or implementations, a single cell or multiple cells may be determined, across which the selected image is to be placed. FIG. 5 illustrates an example method 500 to determine the cells in the grid for placement of the selected image. The method proceeds to block 322.

In block 322, it is determined if there are more images in the identified plurality of images that have not yet been placed in the display layout. If it is determined in block 322 that there are more images to place, the method proceeds to block 318 to select a next image in the sort order. If it is determined in block 322 that there are no more images to place, the method proceeds to block 324.

In block 324, one or more images of the plurality of images are modified based on the display layout. For example, one or more images may be cropped, centered, or otherwise modified. In some examples, if an image of the plurality of images is to be placed in a single cell of the grid, the image may be cropped, centered, or otherwise modified to fit in the single cell of the grid. For example, in implementations where each cell of the grid is square-shaped, the single-cell image may be cropped to a 1:1 aspect ratio. In some implementations, a smart crop may be performed. For example, to perform the smart crop, a salient region of the image may be identified prior to cropping (e.g., a region centered on a detected face, object, etc. in the image), such that the cropping retains image content in the salient region. For example, the cropping may be performed centered on the salient region. One or more automatic cropping techniques can be used to perform the smart cropping. In some implementations, the cells in the grid may be other shapes, e.g., rectangular, circular, etc. and the images are cropped to match the shape. Both the original image and the cropping image can be stored in available storage, e.g., memory or other storage device.

In another example, if an image of the plurality of images is to be placed across two or more cells (e.g., as determined in block 320), the image may be cropped to a particular aspect ratio allowing the image to fit across the two or more cells. For example, if the grid is a square grid, and the image is to be displayed across 2 rows and 2 columns of the square grid in a 2×2 pattern, the image may be cropped to a square shape. In another example, if the grid is a square grid, and the image is to be displayed across 3 rows and 1 column of the square grid in a 1×3 pattern, the image may be cropped such that the region of the image that is retained after cropping has a width to height ratio of 1:3. In some implementations, e.g., when the aspect ratio of the selected image matches the size of the grid cells over which the image is placed, no cropping is performed. Other modifications can be performed to the selected image in some implementations, e.g., adding a frame around the border or perimeter of the selected image, adjusting the color of one or more pixels in the image according to a user preference or predefined color or scheme, etc. The method continues to block 326.

In block 326, the identified images, or a subset thereof, are caused to be displayed in the display layout in a display view of a display device (e.g., display screen, display projector, etc.). Particular identified images may be displayed across a single cell of the grid if they are not within the selected subset of highlighted images or if they have otherwise been determined for single-cell display, or may be displayed as highlighted images across multiple cells if they are determined to be within the selected subset of images and qualify for highlighting, as described herein.

For example, if a server (e.g., server device 104) implements the method 300, the server may generate and send data and/or commands to a client device (e.g., any of devices 120-126) having a display device on which the identified images are displayed. For example, such data may include an image identifier and one or more cell identifiers (e.g., identifying one or more cells in the grid) in which the image is to be displayed. The client device may then generate the display layout, using the data and/or commands sent from the server device. In some implementations, e.g., if a client device (e.g., any of devices 120-126) implements all or part of the method 300, the client device may display the identified images in the display layout on a display screen of the client device. In some implementations, a client device may be coupled to an external display device (e.g., a display monitor, a projector, etc.) separate from the client device, and the client device may generate commands to cause the identified images to be displayed on the external display device.

In some cases or implementations, there may be more identified images than grid cells displayable in the display view of the display device at one time. In such cases, a subset of the identified images can be displayed in the display view on the display device. User input can be received by the user device to change the display view to show one or more other images of the identified images. For example, user input from a user swiping a finger on a touchscreen, or other types of user input, can cause the display view of images to scroll in a direction corresponding to the direction of the swiping motion, which moves some images out of the display view and other images into the display view. In some examples, user input can cause the display view to scroll down such that the top row of images moves up and off the top of the screen and a next row of images moves up and onto the bottom of the screen. The display view can also be scrolled up, to provide the opposite effect. Some implementations can allow scrolling the view of images in other directions for corresponding effect (e.g., left, right, etc.). In some other examples, pages of images can be displayed and changed to other pages without scrolling.

In some implementations, a minimum number of images are designated to be placed in the display layout as highlighted images, e.g., based on received user preferences, default settings, etc. For example, if a minimum number of images is designated as three, and only two images have been included in the subset of images determined in block 314, then a third image can be selected for inclusion in the subset and for highlighting. In some examples, such additional images can be images having the next highest importance scores after the images included in the subset. In some implementations, multiple images can be required to be highlighted based on determined or designated characteristics of images. For example, multiple images can be linked such that if one of the images is highlighted, all of them are to be highlighted regardless of their importance score or inclusion in the subset (and can be displayed with a minimum display distance between them, if needed). For example, if it is determined that two linked images respectively depict a user's two children (e.g., determined based on tags of the images, user input, and/or image recognition techniques that are used if user consent has been obtained), then if one of these two images is determined to be highlighted, the other linked image is also highlighted.

In some implementations, one or more highlighted images can be displayed with one or more other modifications to the image or grid to further emphasize the highlighted images. For example, one or more highlighted images can be displayed with a border or frame, can be displayed in a higher brightness or greater contrast than non-highlighted images, can be displayed with an animation (e.g., a cinemagraph created from multiple similar images, or the image moves in a pattern within a small area surrounding the grid cell it occupies, etc.), can have a label displayed near the images (e.g., user-added labels or labels automatically determined from metadata and/or image content), etc.

In some implementations, one or more additional display modes can be available on the device. For example, a different display mode can suppress all highlighted images so that all images are displayed at the same size in the displayed layout. In some examples, a display mode that displays smaller versions of the images can perform such suppression of highlighted images.

In some implementations, the subset of images and images designated to be highlighted can be determined as described herein, but one or more of these images can be suppressed such that these one or more suppressed images are displayed as non-highlighted. The system can then check for user input that selects at least one of these one or more suppressed images (e.g., based on user input on a touchscreen such as a tap, double tap, swipe, etc., or based on other user selection via a pointing device, voice input, etc.). In response to the selection, the system can then display the selected image in its highlighted form, rearranging other images in the display layout as described herein. In some implementations, the highlighted size and/or position of the suppressed image can be determined prior to display and provided in response to the selection. In some implementations, the determination of the highlighted size and/or position can be performed after the selection, e.g., just prior to display of the image in its highlighted form.

In some implementations, a selection of a highlighted image in the display layout can cause the selected highlighted image to be increased additionally in size and/or otherwise additionally highlighted. In some examples, the selected highlighted image is displayed over the entire grid, over the entire display view in which the grid is displayed, or over the entire display screen or display area of the device.

In FIG. 3, various blocks (e.g., blocks 312-326) are illustrated as being performed sequentially. It will be appreciated, however, that these blocks may be re-arranged as convenient to suit particular embodiments and that these blocks or portions thereof may be performed concurrently in some embodiments. It will also be appreciated that in some examples, various blocks may be eliminated, divided into additional blocks, and/or combined with other blocks.

For example, in some implementations, blocks 312-322 are performed by a server, and blocks 324-326 are performed by a client device. These implementations may be advantageous, e.g., when the number of images is large. For example, by implementing block 312 on a server, an image library of the user that includes a large number of images may be accessed and images may be identified more efficiently than a client device, e.g., if the server has a greater processing speed, high bandwidth connection to network 130, if the server stores the image groups (e.g., in database 106), etc. In these implementations, the server may provide (e.g., transmit over network 130) the cells identified to display an image (e.g., as data and/or commands) to a client device, e.g., for the client device to utilize to cause the identified images to be displayed. This may be advantageous, e.g., since the data file may be small in file size and can eliminate the need for a client device to perform blocks 312-322 of the method which may require substantial network usage and/or significant processing power, e.g., to determine the subset of images. By implementing blocks 312 and 314 on a server, a relatively higher computational power of a server may permit faster determination of image subsets, e.g., than with a relatively low computational power client device.

In some implementations, e.g., when the user does not prefer to upload images to a server, or when the client device is outside of a network coverage area (or when access to the network is expensive in computational or network resources), performing all or part of method 300 on a client device may be advantageous, e.g., to enable display layouts to be determined locally. In some implementations, performing all or part of method 300 on a server may be advantageous, e.g., when the number of images accessed is large, to choose the subset of images based on a larger number of parameters, etc.

FIG. 4 is a flow diagram illustrating an example method 400 to select a subset of images that may be highlighted, according to some implementations. For example, FIG. 4 may be implemented to select the subset of images per block 314 of FIG. 3.

In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 400.

In block 402, it is checked whether user consent (e.g., user permission) has been obtained to use user data in the implementation of method 400 (and method 300, described above). For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations. If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, the remainder of method 400 is not performed, and/or particular blocks needing the user data are not performed.

In block 410, an importance score for each of the identified images is determined. In various implementations, if user consent has been obtained, the importance score may be based upon one or more of visual characteristics of the image (e.g., indicating visual quality of the image), a number of faces in the image, prior user interaction with the image (e.g., a view count for the image, a share count for the image, an edit history for the image, etc.), whether a large face appears in the image, whether a recognized face appears in the image, a location score for the image, other metadata or user data associated with the image, etc.

For example, in some implementations, an image may be programmatically analyzed to determine the visual characteristics of the image, e.g., including one or more of sharpness, brightness, contrast, exposure level, noise level, etc. based on pixel values of pixels of the image. The method may determine a stronger or higher importance score for an image with visual characteristics meeting particular predefined thresholds or a particular combined threshold, e.g., indicating a higher visual quality, based on a determination that users are more likely to find images of higher visual quality to be of greater interest. The method may determine a weaker or lower importance score for an image with visual characteristics not satisfying particular predefined thresholds or a particular combined threshold, e.g., indicating a lower visual quality. In some implementations, machine learning techniques can be used to determine a measure of image quality for the image, e.g., based on training images that have been previously judged (e.g., by humans) as to visual quality.

In some implementations, where the user provides consent for such analysis, a number of faces that appear in an image may be determined, e.g., by using facial recognition techniques. In this example, an importance score may be determined based on the number of faces that appear in the image. In different implementations, the importance score determined based on the number of faces may be different. For example, when the user consents to analysis and/or determination of user preferences, it may be determined that the user prefers portrait images that depict a single person, instead of images that depict a group of persons. In this example, a number of faces equal to one (or a small number) may be indicative of a higher importance score. Further, in some implementations, where the user provides consent to use of user data, the faces may be analyzed to determine if a large face (e.g., a face that is over a threshold size, such as a face that occupies 25% of the image, 50% of the image, etc.) and/or a recognized face (e.g., of a person in the user's social network, in the user's contact list, etc.) is present in the image. If a large face is present (e.g., indicating a portrait photograph) or a recognized face is present (e.g., the user's friend, the user's spouse, a user's favorite contact, etc.), a relatively higher importance score may be assigned to the image. If a face is recognized as that of a particular individual, consent is obtained from that individual to perform such recognition and assign importance scores based on the recognition. In some implementations, a higher importance score may be assigned based on detecting a particular facial expression. For example, a smiling face can be associated with a higher importance score, and a frowning or angry face can be associated with a lower importance score, or the importance scores can be determined based on user preferences. In implementations where such consent is not provided, facial recognition is not performed and recognized face and expression is not used as a parameter to determine the importance score.

In some implementations, if user consent has been obtained, the importance score may be determined based on prior user interaction with the image, e.g., interaction by the user who owns or has access to the image, and/or interaction by one or more other users (e.g., for a shared image in which other users have access to the image, e.g., via other user devices connected over a network). Prior user interaction can include a view count for the image, when the user consents to use of view count data. For example, when the user consents to collection of viewing data, a view count may be maintained (e.g., by server device 104 or any of client device 120-126) for images that the user has viewed. The view count indicates the number of times that the user has viewed the image, e.g., caused the image to be displayed for viewing on a client device or server device. If it is determined that the view count for an image is high, e.g., 10, the image be assigned a higher importance score, than another image that has a low view count, e.g., 1. In some implementations, where the images are shared among multiple users (e.g., in a shared album or image library), the view count may be determined for each individual user and utilized to determine the importance score of the image for that user. In some implementations, where the images are shared among multiple users, the view count may be determined across two or more of the multiple users (when each of the multiple users provides consent to determine the view count), and the overall view count across the two or more users (e.g., which may indicate a popularity of the image) may be utilized to determine the importance score of the image. In implementations where users decline the use of user data, view count is not utilized in determination of the importance score.

In some implementations, when users consent to use of such data, prior user interaction can include a share count for the image that may be determined and utilized to determine the importance score. For example, if a user has shared the image with other users (e.g., via a social network, via e-mail, via a messaging service, by printing the image, etc.), the share count (number of times the image has been shared) for the image may be high and may indicate a relatively higher importance of the image. In another example, if an image is in a part of an image library or a shared image album that is shared between multiple users, it may be assigned a higher importance score than an image that is accessible only to the user. In implementations where users decline the use of user data, share count is not utilized in determination of the importance score.

In some implementations, when users consent to use of such data, the prior user interaction can include prior edits made to the image by one or more users. For example, when users consent to use of such data, an edit history of the image may be determined and utilized to determine the importance score. For example, if the image was edited, e.g., one or more image editing functions (e.g., auto-enhance, crop, vignette, focal zoom, change brightness or contrast, use brush tool to modify pixels, etc.) were utilized by the user, it may indicate that user engaged with the image, and therefore, that the image may be of greater interest to the user than other images that were not edited. In implementations where users decline the use of user data, edit history is not utilized in determination of the importance score.

In some implementations, a location score may be determined for the image and used to determine an importance score. For example, a location associated with the image may be determined based on location data (e.g., image metadata that includes location information, such as geographic coordinates), identification of a well-known landmark that is at a known location (e.g., Taj Mahal, Statue of Liberty), etc. Further, when the user consents to use of user data, one or more locations associated with the user, e.g., a home location, a work location, a weekend location, etc. may be determined. The location associated with the image may be compared with the one or more locations associated with the user to determine the location score. For example, the location score may be high for images that have an associated location that is greater than a particular distance away from a home location, e.g., indicating that the image may have been captured during a vacation. In another example, the location score may be high for images that have an associated location that is a well-known spot for capturing images, e.g., a scenic viewpoint in a national park. An importance score for the image may be determined based on its location score.

In some implementations, other types of metadata (besides location) and other data associated with the image can be used to determine an importance score for the image, if user consent has been obtained. For example, a timestamp of an image can be used to determine an importance score, e.g., based on determined preferences of a user or general default preferences. For example, an image captured on an anniversary date or other special date can be assigned a higher importance score, or an image captured on a vacation or event of a user based on user calendar data (accessed if user consent has been obtained). An image captured more recently than another image can be assigned a higher importance score than the other image. Similarly, particular types or aspect ratios of images (e.g., landscape orientation, panoramic image, video, etc.) can influence the importance score based on user preferences or default settings.

In some implementations, a number of near similar images in the identified images may be determined for each image and used to determine an importance score. For example, near similar images may correspond to images that depict similar image content (e.g., one or more same types of image features as described below), were captured within a particular time interval, and/or were captured at the same location (e.g., within a predetermined distance of each other), which may indicate that the user expressed interest in the subject matter of the image. An image having a higher number of near similar images can be assigned a higher importance score. In some implementations, a high quality image from among the near similar images may be assigned a high importance score. In some implementations, a number of near similar images that is more than a threshold number (or is more than a threshold percentage of the total number of identified images) may be assigned a high importance score.

For example, in some implementations, if user consent has been obtained, particular types of image features visually depicted in the identified images may be determined to have importance to the user, and can be used to determine or influence importance scores of the images. Such types of image features can be detected in a variety of ways, e.g., by obtaining user-created labels (descriptors) associated with the images (e.g., as metadata) that describe image content of the images, and/or by obtaining or generating labels or other data describing image features which have been generated by a system using image recognition and detection techniques (if user consent has been obtained). For example, the types of image features can be labeled using various descriptors and categories at various levels of categorization, specificity, and/or hierarchy (e.g., a type of "animal" can be detected in an image, and this image feature can also be determined as a sub-type of "animal," such as "dog"). Labels can be determined by a system, in some cases, by accessing knowledge bases (e.g., knowledge graphs) and/or database data indicating descriptors related to the descriptors of determined image features. Various types of image features can include landscape features (e.g., mountains, sunsets, trees, buildings, etc.), animals, objects, monuments, etc.

In some examples, the count of images having a particular type of image feature can be determined in the set of identified images, and if that count is above a threshold count or is above a threshold percentage of the total number of identified images, then this type of image feature can be considered important to the user, and the images having that image feature can be assigned or weighted with a higher importance score. For example, if a large number of "dog" image features (e.g., above a threshold number) are detected in the identified images, then the particular identified images having that type of image feature are assigned a higher importance score. In some implementations, the system can access stored data that indicates particular labels or types of labels are more popular than other labels generally among a large population of users and/or are judged to be of higher quality by such users (e.g., data showing how frequently that different types of image features are transmitted, shared, and/or viewed among a large set of users who have provided consent for use of such data). In some implementations, images having image features with more popular labels can be weighted with a higher importance score.

Some implementations can assign an importance score that indicates the image should not be selected for highlighting. For example, a zero or negative importance score can be used. Alternatively, other checks or indicators can be used to filter out particular images to prevent them from being highlighted. For example, various implementations may filter out particular images from being highlighted if the images have one or more particular characteristics, e.g., specified in default settings or stored user preferences. For example, the one or more particular characteristics can include the image having a timestamp that indicates the image was captured more than a threshold time period before the current time, the image depicts particular types of image content, etc. Some implementations can weight the importance score negatively by a predetermined amount based on such characteristics.

In some implementations, some types of image features can be weighted positively in importance score based on one or more particular characteristics specified in default settings or stored user preferences. For example, the characteristics can include timestamp (e.g., a more recent timestamp), a particular type(s) of image feature detected in the image, etc. In some examples, an event such as a party, determined based on detected image features such as a cake and party hats, can be weighted higher in importance score by default or based on user preferences.

In some implementations, a user may be provided with an option (e.g., via a user interface) to specify the importance of an image. For example, a user may indicate an image as important, e.g., by selecting a user interface option to mark the image as a favorite image. When the user provides such indication of importance for an image, in some implementations, the importance score may be set to a value (e.g., a high importance value) for the image, such that the image is included in the subset of images.

In various implementations, two or more of the above parameters (e.g., characteristics related to the image) may be used in combination to determine the importance score. In some implementations, a weighted average of the parameters may be calculated to determine the importance score. In some implementations, visual characteristics may be determined to indicate a low importance score (e.g., low visual quality), and other parameters may not be evaluated. In some implementations, when the user consents to such analysis, image content may be analyzed to determine a low importance score, e.g., if the image is that of a document (e.g., a receipt), if the image is a screenshot, if the image is that of a whiteboard, etc. In some implementations, it may be determined if the user has marked the image as a favorite, and favorite images are assigned a high importance score.

In some implementations, the importance score may be normalized. For example, in different implementations, the techniques used to determine the importance score may vary over time, e.g., due to changes in the user's preferences or activity, due to changes in weights assigned to different parameters, due to variance in image quality (e.g., a user may take some images using a camera that produces low quality images, and other images using a camera that produces high quality images), due to additional or fewer image characteristics or other factors being considered to determine the importance score, etc. Normalizing the importance score may adjust the importance score for an image, based on the overall importance scores for images associated with the user. In some implementations, a minimum importance score can be enforced for an image, e.g., based on the overall importance scores for images associated with the user.

In block 412, the importance score (e.g., normalized importance score) of each identified image is compared with an importance threshold. Images in the identified plurality of images (e.g., in block 312 of FIG. 3) that meet the importance threshold (e.g., have scores higher than or equal to the importance threshold) are added to a subset of images. For example, the subset of images can be designated images that are eligible to be displayed as highlighted images. For example, the importance threshold may be specific to the user, based on aggregate importance scores of images associated with the user. For example, a high importance threshold may be used for a user who is associated with images having a high average (or median) importance score, and a lower importance threshold may be used for a user who is associated with images having a low average (or median) importance score. In this manner, the method increases the likelihood that at least a few images from the user's library are selected for highlighting or prominent placement in the display layout. The method continues to block 414.

In block 414, a percentage of images from the identified plurality of images (e.g., in block 312 of FIG. 3) that are in the subset of images selected in block 412 is calculated. For example, the percentage of images in the subset may be based on a count of images in the subset divided by a count of the identified plurality of images. For example, if the subset includes 50 images from a total of 200 identified images, the percentage may be 25%. The method continues to block 416.

In block 416, it is determined if the percentage calculated in block 414 meets a prominence threshold. For example, the prominence threshold may be determined based on a target percentage (e.g., 5% or 6%) of the identified images that are to be highlighted or placed prominently in the display layout. If it is determined that the prominence threshold is met, e.g., if there are more than the target percentage of images, the method continues to block 418. If the prominence threshold is not met, the method continues to block 420.

In block 418, one or more images are removed from the subset. For example, images may be removed from the subset based on associated importance scores, e.g., an image in the subset that is associated with the lowest importance score may be removed first, an image in the subset that is associated with a second lowest importance score may be removed next, and so on. In some implementations, one image at a time may be removed from the subset in implementing block 418. In some implementations, more than one image at a time may be removed. The method then continues to block 416, to evaluate if the prominence threshold is met. In this manner, if the number of designated images in the subset are more than the prominence threshold, the method can remove images from the subset until the number of designated images are at or below the prominence threshold. This feature can reduce a visual effect of having a large percentage of highlighted images displayed in a collection of images, where such a visual effect may reduce the visual distinctiveness or importance of highlighted images due to the large percentage.

In another implementation (not shown), upon determination that the prominence threshold is met, the importance threshold may be adjusted (e.g., raised) and the method may continue to block 412 to determine the subset of images. This can cause a lower number of the identified images to qualify for the subset of images as designated images that are eligible to be highlighted.

In block 420, one or more images in the subset of images that meet a similarity threshold are removed. For example, an image in the subset may be programmatically analyzed to determine similarity with other images in the subset. For example, similarity may be determined based on comparison of pixels of the image in the subset with pixels of other images in the subset. In some examples, similarity of color, brightness, and/or other pixel characteristics can be determined. In another example, one or more image content features (e.g., objects, landscape features, etc.) that are in the image in the subset may be determined, based on programmatically analyzing the image, e.g., using one or more image feature recognition techniques if user consent has been obtained. Other images in the subset may be programmatically analyzed to determine if they include the same or similar image content features, e.g., have similar shapes, colors, sizes, etc. In some implementations, detected image features can be labeled and/or categorized into predefined categories (e.g., people, animals, vehicles, landscapes, etc.), and if two image features are determined to be in the same category, they are considered similar. If it is determined that at least one other image includes similar one or more image content features as the image in the subset, the image in subset may be determined to meet the similarity threshold. If the image meets the similarity threshold (e.g., is determined to be substantially similar to at least one other image in the subset, by having the same content, was captured at or near the same location, etc.), the image is removed from the subset. By removing similar images, diversity among highlighted images may be increased.

In FIG. 4, various blocks (e.g., blocks 410-420) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 is a flow diagram illustrating example method to determine cells in an image grid for an image, according to some implementations. For example, FIG. 5 may be implemented to determine cells in the grid for a selected image, per block 320 of FIG. 3.

In some implementations, method 500 can be implemented, for example, on a server system 102 as shown in FIG. 1. In other implementations, some or all of the method 500 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 500.

In some implementations, the method 500, or portions of the method, can be initiated automatically by a device.

In block 502, it is checked whether user consent (e.g., user permission) has been obtained to use user data in the implementation of method 500. For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations. If user consent has been obtained from the relevant users for which user data may be used in the method 500, then in block 504, it is determined that the blocks of the methods herein can be implemented with possible use of user data as described for those blocks, and the method continues to block 510. If user consent has not been obtained, it is determined in block 506 that blocks are to be implemented without use of user data, and the method continues to block 510. In some implementations, if user consent has not been obtained, the remainder of method 500 is not performed, and/or particular blocks needing the user data are not performed.

In block 510, an image is identified. For example, the image may be an image that is selected in block 318 of method 300. In some implementations, the image is identified based on the sort order, as described above with reference to FIG. 3. The method continues to block 512.

In block 512, a next available cell in the grid is determined. For example, if the image identified in block 510 is the first image in the plurality of images, the grid is empty and a first cell of the grid is determined as the next available cell. In some examples, if the grid is a right-then-down grid in which the grid direction (e.g., layout direction) flows from left to right and then from top to bottom (e.g., a right-then-down grid direction), the cell at a top left corner of the grid may be determined as the first cell of the grid. In another example, if the image identified in block 510 is a subsequent image identified after one or more images are placed in the grid, the next available cell is the first empty cell, e.g., a cell in which no image has been placed. For example, when the grid is a right-then-down grid, the next available cell may be a cell to the right of the last cell in which an image was previously placed. If the last cell in which an image was previously placed is in a rightmost column of the grid, the next available cell may be a cell in the leftmost column of the next row down, e.g., the row directly below the row of the last cell.

In some implementations, where the user permits use of user data, the grid direction may be right-then-down based on a determination that a language or locale preference for user is for a language that is written right-to-left and top-to-bottom of a page. In some implementations, where the user permits use of user data, the grid direction may be left-then-down based on a determination that a language or locale preference for user is for a language that is written left-to-right and top-to-bottom of a page. In some implementations, the grid direction may be a down-then-right, e.g., if the user data indicates that the language or locale preference of the user is for a language that is written top-to-bottom and then left-to-right on a page. In some implementations, the right-then-down grid direction may be used as a default, e.g., when the user declines use of user data. It may be understood that determination of the next cell is based on the grid direction (or type of grid), e.g., right-then-down, left-then-down, down-then-right, etc. The method continues to block 514.

In block 514, it is determined if the image is in the subset of images eligible to be highlighted. For example, it may be determined whether the image is in the subset of images selected in block 314 of method 300. In some implementations, the subset of images may be selected using the method illustrated in FIG. 4. If the image is in the subset, the method proceeds to block 516. If the image is not in the subset, the method proceeds to block 526.

In block 516, it is determined if the next available cell in the grid satisfies one or more neighborhood criteria. For example, it may be determined that the next available cell does not satisfy a neighborhood criterion if the next available cell is adjacent to at least one cell in the grid that partially includes an image, e.g., at least one cell that was previously filled by an image that occupies more than one cell (e.g., previously filled by a designated image from the subset of images that has been highlighted in the grid). In this example, an adjacent cell may be any cell that shares a border in the grid with the next available cell. In some implementations, an adjacent cell may be any cell that is within a threshold distance (e.g., proximity threshold distance) from the next available cell (e.g., adjoining the next available cell—a distance of 1; adjoining a cell that shares a border with the next available cell—a distance of 2; etc.). Such a neighborhood criterion allows placement of highlight images in the grid in a manner that avoids overlaps or touches (adjacencies) with other highlighted images (e.g., images displayed across two or more cells). In this manner, the method promotes a minimum visual distance between highlighted images, increasing the distinctiveness of multiple displayed highlighted images. In some implementations, the neighborhood criterion, e.g., threshold distance, can be varied based on the number of columns available in the grid. For example, for a larger number of grid columns, a larger threshold distance can be used. If it is determined that the next available cell satisfies the neighborhood criterion, the method proceeds to block 518. If it is determined that the next available cell does not satisfy the neighborhood criterion, the method proceeds to block 526.

In block 518, an aspect ratio of the image is determined. For example, in some implementations the aspect ratio may be determined based on image metadata. For example, the aspect ratio may be equal to or within a threshold of the following example ratios: 1:1 (image type: square); 3:1, 4:1, 5:1, etc. (image type: horizontal panorama); 1:3, 1:4, 1:5, etc. (image type: vertical panorama); 3:2, 4:2, etc. (image type: landscape); and 2:3, 2:4 (image type: portrait) etc. The method continues to block 520.

In block 520, one or more subsequent cells are determined based on the aspect ratio. Subsequent cells can be cells that, along with the next available cell, form a configuration of cells across which to place the image. For example, the configuration can include a set of cells including the next available cell and one or more subsequent cells. Each subsequent cell can be adjacent (or connected) to at least one other cell in the set of cells, to form the configuration. In some implementations, subsequent cells can be determined subsequent to the determination of the next available cell. In some cases or implementations, subsequent cells can appear in the grid spatially following the next available cell in the grid direction (e.g., in the right-then-down direction). For example, if the aspect ratio indicates a square image, a 2×2 configuration can be selected to highlight the image, where the subsequent cells may be one cell to the right of the next available cell, and two cells that are directly below the next available cell and the cell to the right of the next available cell. Other implementations can provide a 3×3, 4×4, or other sized-configuration of cells for a square image that similarly determines the subsequent cells.

In implementing block 520, the one or more subsequent cells are determined such that the spatial configuration of the next available cell and the subsequent cells is based on the aspect ratio of the image, and the total number of subsequent cells and the next available cell equal a number of cells determined for the configuration that is based on the aspect ratio of the image. For example, if the aspect ratio is determined as portrait, a predetermined configuration of 2×3 cells may be selected, which is associated with a portrait aspect ratio, e.g., a total of 6 cells across 2 rows and 3 columns of the grid. In some implementations, a different configuration of cells can be selected for a portrait aspect ratio (e.g., 3×4 cells, 5×6 cells, etc). In various implementation examples, different grids may use different numbers of subsequent cells, e.g., a number and configuration of subsequent cells may be determined such that the image is placed across m cells in a horizontal direction and across n cells in a vertical direction, where m and n are determined based on the aspect ratio. In the example described above, for a square image, m and n are both equal to 2. In further examples, for a vertical panorama, m is equal to 1 and n is equal to 3; for a landscape image, m is equal to 3 and n is equal to 2, etc. In some implementations, the selected configuration of cells can have the closest or most similar aspect ratio to the aspect ratio of the image out of the possible configurations of cells (e.g., given the shape of the cells, available size of the grid, etc.). In some implementations, a look-up table or other stored, predetermined association can be used to determine a particular cell configuration based on an aspect ratio of the image, e.g., where different cell configurations can be associated with different ranges of aspect ratios.

In some implementations, the next available cell may be a cell located in the grid such that one or more subsequent cells occupied by the highlighted image would be caused to be placed outside the grid, e.g., outside a border of the grid. For example, if the next available cell is in a last column (e.g., the rightmost column) of the grid, one or more subsequent cell(s) would need to be placed outside the rightmost border of the grid. In another example, if the next available cell is in a middle column and the highlighted image occupies 3 horizontal cells, then the second subsequent cell would need to be placed outside the rightmost border of the grid. In such cases, in some implementations, subsequent cells of the highlighted image may include cell(s) placed in a different direction than the grid direction. For example, subsequent cell(s) may include cell(s) placed to the left of the next available cell (and/or to the left of other subsequent cells). In these implementations, some images may be placed in the grid in a manner inconsistent with the sort order. FIGS. 6D and 6E (described below) illustrate one such example. In another example, if the aspect ratio indicates a vertical panorama, the subsequent cells may be one or more cells below in the same column as the next available cell (e.g., cells in the next 2 rows in the down direction, cells in the next 3 rows in the down direction, etc.), e.g., so that the highlighted image has a width of 1 cell and a height of multiple cells (3 cells, 4 cells, etc.). The method continues to block 522.

In block 522, the image is placed across the next available cell and the subsequent cells that were determined in block 520. In some implementations, placing the image may include generating data that includes an image identifier and cell identifiers corresponding to the next available cell and the subsequent cells. In some implementations, placing the image may include generating one or more commands that indicate that the image is to be placed in the display layout such that it occupies the next available cell and the one or more subsequent cells.

In some implementations, placing the image across the next available cell and the determined subsequent cells may result in a display layout that includes one or more highlighted images that are "hanging." For example, a highlighted image may be hanging when one or more cells adjacent to the highlighted image are empty. In some examples, a hanging highlighted image may be located in a last row of a grid of images, and may extend into one or more rows below other adjacent images in the grid to the side of the highlighted image, such that empty cells are present on a side of the highlighted image. For example, in some implementations, a hanging highlight image is detected by checking for one or more empty cells positioned on the left side of a highlighted image.

In some implementations, if placing the image causes a hanging highlighted image to exist in the grid, the image may be placed as a non-highlighted image in the single cell of the next available cell, such that highlighting of the image is suppressed. By implementing block 522 in this manner, the display layout may reduce or eliminate hanging images.

In some implementations, if the placement results in a hanging highlighted image, block 520 may be performed after block 522, with a different grid direction. For example, if the grid direction is right-then-down, a different direction of left-then-down may be used, and block 520 may be repeated (or the highlighted image may be moved or shifted one cell to the left). In another example, if the grid direction is right-then-down, a different direction of up may be used, where the highlighted image is moved or shifted one cell upward. In some implementations, if both left and up movement directions for the highlighted image are available, the direction that creates the least amount of overall empty cells can be selected.

Figure 7A:
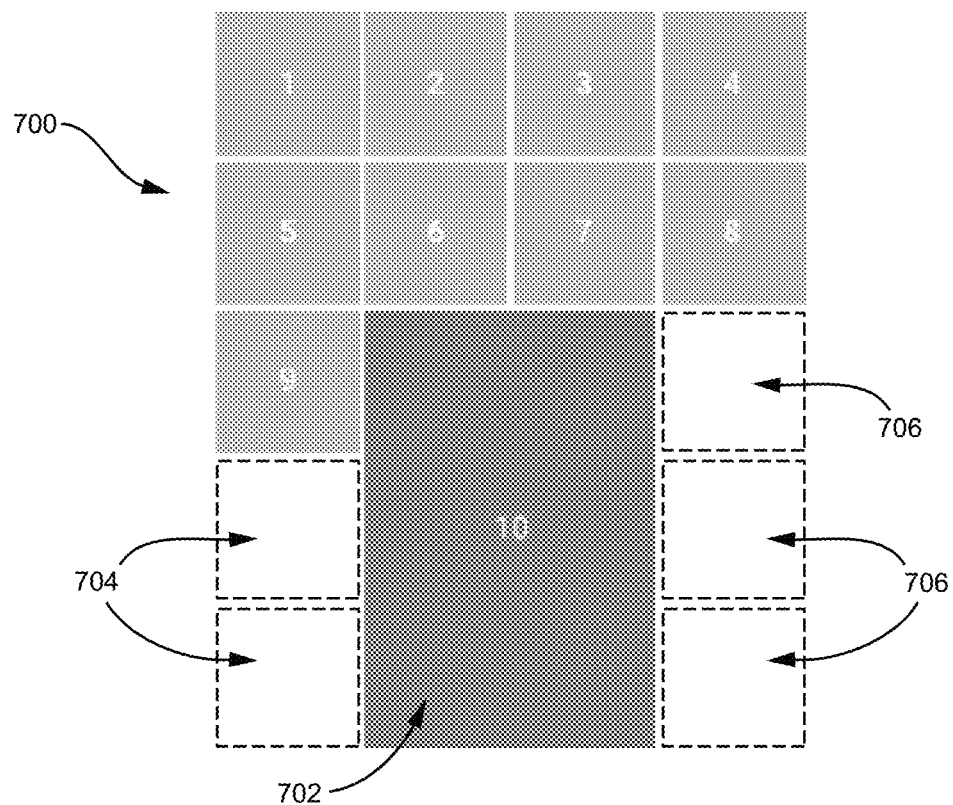
FIG. 7A illustrates an example display of a plurality of images arranged in a display layout and including a hanging highlighted image.
Figure 7B:
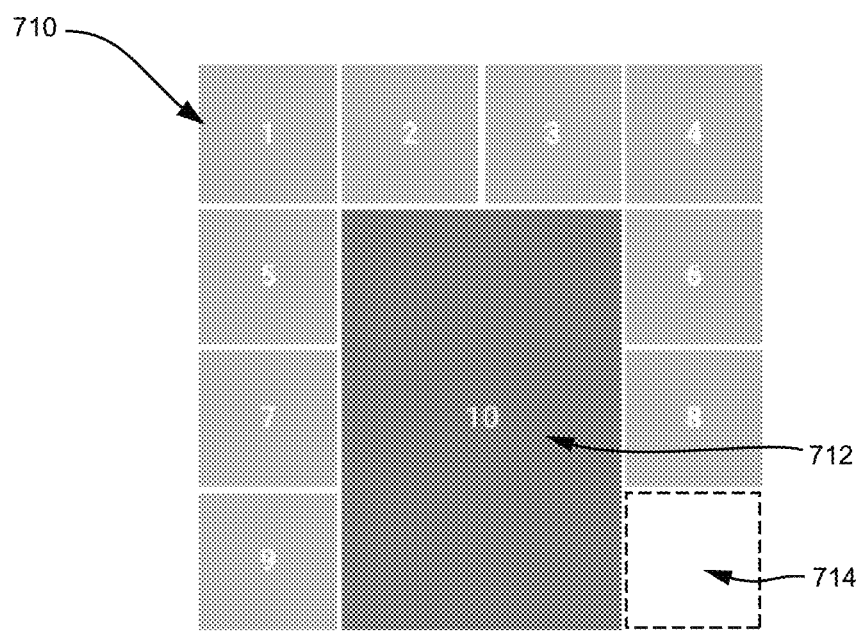
FIG. 7B illustrates an example display of the plurality of images of FIG. 7A arranged in a display layout after an example adjustment for the hanging highlighted image, according to some implementations.

By moving the highlighted image up or left, or performing block 520 with a different grid direction, e.g., in a manner that reduces the number of empty cells that adjoin a highlighted image, the images may be placed in the grid inconsistent with the sort order. In some implementations, cells near the hanging highlighted image may be rearranged, e.g., moved to occupy the empty cells surrounding the hanging highlighted image, as described below for block 524. Furthermore, in some cases, moving the highlighted image one cell up or left may not be an option, or may not remove empty cells adjacent to the highlighted image. In such cases, in some implementations, one or more non-highlighted images can be rearranged (e.g., in sort order and grid direction) to fill the empty cells (which may move the highlighted image more than two cells, in some cases). FIG. 7A illustrates an example grid with a hanging highlighted image and FIG. 7B illustrates an example grid that has been adjusted to reduce the number of empty cells adjacent to the highlighted image, and having images inconsistent with the sort order.

In some implementations, the placement of the highlighted image may be adjusted to increase diversity of the locations of multiple highlighted images in the grid and increase visual distinctiveness of highlighted images. For example, if two or more highlighted images are consecutively placed along the same right border (or left border) of the grid layout, or placed in the same middle cell columns of the grid layout, then such a presentation may be too uniform and reduce visual distinction of the highlighted images. For example, in some implementations, highlight images may be biased to be positioned along a particular border of the grid layout due to the placement rules for determining next available and subsequent cells.

In some implementations, to increase diversity of highlight image placement, the system can determine whether there are one or more previously-placed highlighted images within a threshold distance of the highlighted image currently being placed (e.g., within one or two grid cells), where the previously-positioned highlighted image(s) are positioned in the same columns and/or positioned along the same border of the grid as the currently-placed highlighted image. In some implementations, the system can determine also whether these highlighted images are the same cell width, e.g., occupy the same number of cell columns. If the checked conditions are met, the current highlighted image may be shifted one or more columns in a determined direction to cause its column placement to be different than the previous highlighted image(s). For example, if the previous highlighted image is positioned next to the right border of the grid, and the current highlighted image has been determined to also be placed along the right border, then the current highlighted image can be shifted one cell column to the left, providing a more staggered visual presentation of close by highlighted images. One example of such shifting is described below with respect to FIGS. 8A and 8B. The method continues to block 524.

In block 524, one or more previously-placed images in the grid can be adjusted or rearranged in their positions within the layout based on the placement of the image in block 522, if appropriate. For example, if subsequent cell(s) were selected for the highlighted image that were already occupied by one or more previously-placed images, those previous images can be rearranged to be placed in the next available cells, taking into account the placement of the highlighted image. In another example, if the highlighted image is shifted to provide positional diversity as described above, then rearrangement of previously-placed images can be performed. In some implementations, such previously-placed images can be rearranged by placing them around the placed highlighted image in the sort order and grid direction (e.g., right-then-down).

The method continues to block 322 of FIG. 3, where it can be checked whether there is another image for which cells can be determined in the grid for placement.

In some implementations, restrictions can be provided on placements (or rearrangements) of images that would be inconsistent with the sort order. For example, an out-of-order limit can be defined. In some examples, an image may not be placed or moved within the grid if such placement or movement would cause the image to be placed two or more positions out of the sort order (e.g., two more positions away from any other image that followed it or preceded it in the sort order). Various implementations can impose other limits (e.g., one position away, three positions away, etc.), no such limits, or strict limits (e.g., no inconsistencies in sort order allowed).

Block 526 is performed if the image identified in block 510 is not in the subset, or if the next available cell does not satisfy the neighborhood criterion as determined in block 516. In block 526, the image is placed in the next available single cell. When block 526 is performed after block 516, an image that is in the subset of images (e.g., an image eligible for highlighting and that is associated with a high importance score) is placed in the image grid in a manner that does not highlight the image. In this manner, highlighting of one or more images in the subset may be suppressed in particular grid layouts, e.g., when highlighting such images may cause the grid to include highlighted images that overlap or touch each other, and/or cause empty cells to be displayed between images in the grid layout. The method continues to block 322 of FIG. 3, where it can be checked whether there is another image for which cells can be determined in the grid for placement.

In FIG. 5, various blocks (e.g., blocks 510-526) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

For example, in some implementations, identified images can first be placed in a layout (e.g., grid) as if they are all non-highlighted images, e.g., all having the same size. For example, the images can be placed in sort order. One or more particular images in the layout can be determined to be highlighted similarly as described above. The layout of images can be adjusted to place the highlighted image(s) and to rearrange the non-highlighted images (e.g., in sort order) to accommodate the greater size of the highlighted images, e.g., similarly to block 524.

In various implementations, a system receive user input, can present one or more options or suggestions to the user, and/or can request input, preferences, and/or confirmations related to one or more of the features described herein. For example, in the determination of a sort order and/or an importance score for images, the system can present sample images and/or receive user input that influences the determination of the sort order and/or importance scores for images, as described above. In a determination of cropping of highlighted images and non-highlighted images, a user can provide input or suggestions on which areas of the images are to be retained in the cropping. A user can provide user input to the system indicating display layout preferences for a grid, e.g., whether highlighted images should be diversified in their positions or displayed uniformly, e.g., on the left or right sides of a grid; whether certain types or aspect ratios of images should or should not be used to highlight images; particular configurations of grid cells for highlighted images; particular types of image content to highlight as highlighted images; particular types of image content to highlight in a particular way that is different from the highlighting of other types of image content (e.g., images depicting faces are to occupy more grid cells than images depicting no faces, or are to be displayed as brighter or with a frame, etc.); etc. In some implementations, the system can display one or more images (or additional images) as suggestions to the user to highlight (e.g., images which have the highest importance scores among images not highlighted), and the user can select or confirm particular suggestions to highlight by providing user input.

In some implementations, method 500 (and methods 300 and 400) may be performed by a server (e.g., server device 104), one or more client devices (e.g., client devices 120-126), or a combination of a server and one or more client devices.

Figure 6A:
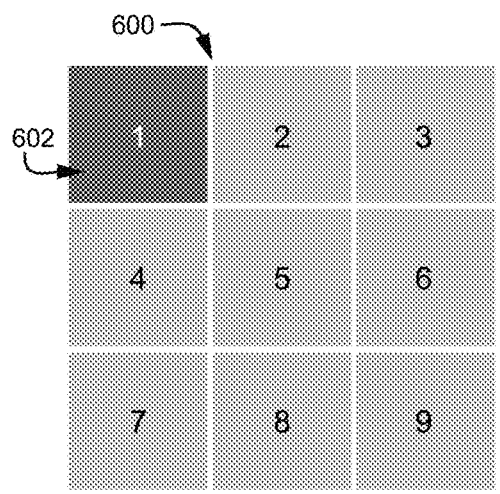
FIGS. 6A, 6C, and 6E illustrates examples of images arranged in grid layouts without displaying highlighted images.

FIG. 6A illustrates an example of a plurality of images arranged in a grid layout without displaying highlighted images. A grid 600 is shown that includes a plurality of images (numbered 1 through 9) in a 3×3 layout without displaying the images as highlighted images. For example, the images are displayed in square cells and may have been cropped (if needed) to fit the aspect ratio of the square cells. An image 602 (numbered 1, in darker shade) has been determined to be a designated image in the subset of images as described herein, and is to be displayed as a highlighted image. Based on the image's actual aspect ratio (a portrait orientation which is not shown in grid 600), a 2×3 configuration of cells is determined, where the image is to be placed across 2 columns and 3 rows of the grid 600.

Figure 6B:
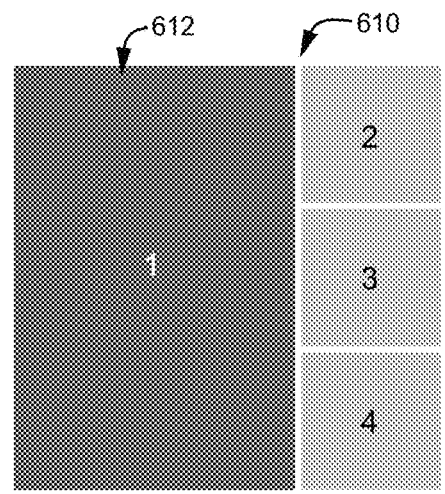
FIGS. 6B, 6D, and 6F illustrate example displays of images arranged in display layouts including display of a highlighted image.

FIG. 6B illustrates an example display of a plurality of images arranged in a display layout including display of one of the images in the grid as a highlighted image. A grid 610 has 3×3 cells and includes a highlighted image 612 (numbered 1, in darker shade) that has been placed across 2 columns and 3 rows of the grid 610 and was previously shown as image 602 in FIG. 6A. In some implementations, to determine the six cells occupied by the image 612, the image 602 of FIG. 6A was extended in the grid direction of right-then-down. Thus, the image 612 started at the cell of image 1 of FIG. 6A, then extended into the subsequent cell corresponding to image 2 of FIG. 6A. To maintain the 2×3 configuration, the next subsequent cell is down to the next row and under the cell corresponding to the first cell, and is the cell corresponding to image 4 in FIG. 6A. The next subsequent cell is selected in a position corresponding to the right of image 4 of FIG. 6A. To maintain the 2×3 configuration, the next subsequent cells of the highlighted image similarly extend to the next (third) row down into the cells corresponding to images 7 and 8 in FIG. 6A.

After determining the placement of the cells for the highlighted image, the image 612 is placed over those cells (modified, e.g., cropped, to fit if necessary) and is displayed in the grid 610. The other, non-highlighted images, if selected for placement following image 612, can be placed in the grid in the next available cells according to the grid direction. For example, the non-highlighted images 2, 3, and 4 are placed down the last (rightmost) column of grid 610, e.g., according to sort order and in the grid direction of right-then-down. In some implementations, one or more of the non-highlighted images of FIG. 6A may have been placed in the grid prior to highlighted image 612, and these images can be rearranged in the grid 610 to accommodate the highlighted image 612 and maintain the sort order and grid direction. The other non-highlighted images shown in FIG. 6A can be placed in the sort order and grid direction in additional rows (not shown) of grid 610 following the third row.

Figure 6C:
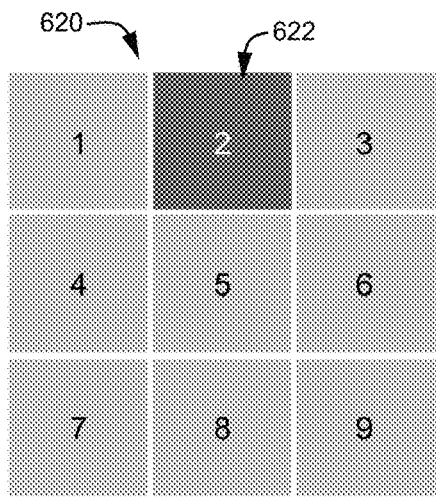
Figure 6D:
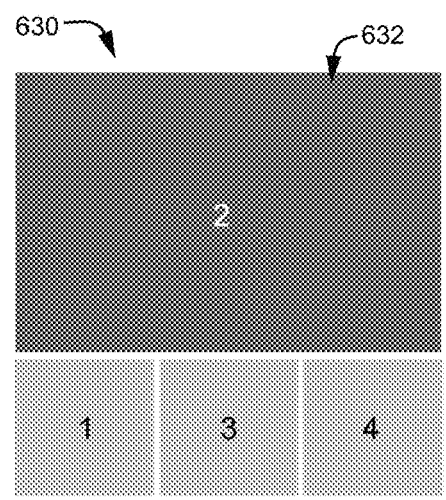
Figure 6E:
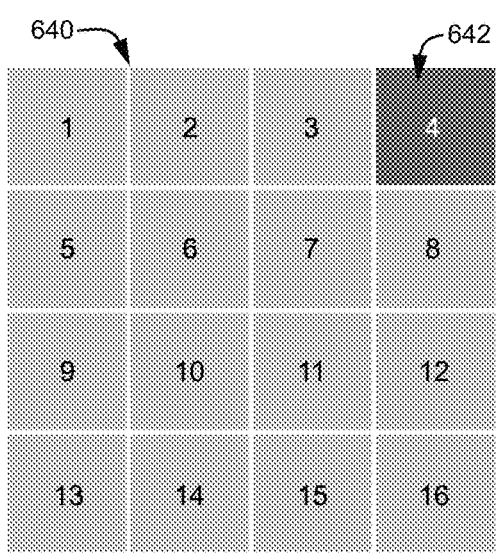

FIG. 6C illustrates another example of a plurality of images arranged in a grid layout without displaying highlighted images. A grid 620 is shown that includes a plurality of images (numbered 1 through 9) in a 3×3 layout. For example, the images are displayed in square cells and may have been cropped (if needed) to fit the aspect ratio of the square cells. An image 622 (numbered 2, in darker shade) has been determined to be a designated image in the subset of images and is to be displayed as a highlighted image. Based on the image's actual aspect ratio (a landscape orientation which is not shown in grid 620), a 3×2 configuration of cells is determined for the highlighted image, where the highlighted image is to be placed across 3 columns and 2 rows of the grid 620.

FIG. 6D illustrates an example display of the plurality of images arranged in a display layout including displaying of one of the images in the grid as a highlighted image. A grid 630 has 3×3 cells and includes a highlighted image 632 (numbered 2, in darker shade) that has been placed across 3 columns and 2 rows of the grid 630. In this example, to determine the six cells occupied by the image 632, the image 622 of FIG. 6C can be extended in a grid direction of right-then-down. Thus, the image 622 started at the cell corresponding to image 2 of FIG. 6C, then extended into the subsequent cell corresponding to image 3 in FIG. 6C. The next subsequent cell would be to the right of image 3 and outside the grid, so the next subsequent cell is selected to the left of the image 2, e.g., the cell corresponding to image 1 in FIG. 6C. The next subsequent cells of the highlighted image extend to the next row down into the cells corresponding to images 4, 5, and 6 in FIG. 6C.

After determining the placement of the cells for the highlighted image, the image 622 is placed to occupy those cells (modified, e.g., cropped, to fit if necessary) and is displayed in the grid 630. Any non-highlighted images previously placed in the grid 630 can be rearranged in the grid 630 to accommodate the highlighted image 632 and maintain the grid direction. Non-highlighted images of FIG. 6C that are placed later than image 622 can be placed in the next available cells of the grid 630 in the grid direction. In this example, the non-highlighted image 1 was previously placed in the grid 630 and is rearranged to be placed in the next available cell after the highlighted image 622 (the first cell in the third row of grid 630). Images 3 and 4 are placed (e.g., later than image 622) across the third row of grid 630 in the sort order and grid direction. In this case, the sort order is not maintained, because the highlighted image 632 (image 2) is out of sort order due to being placed in the first two rows of grid 630. In some implementations, empty cells between images are avoided in the grid 630, so that image 1 is not placed before image 2 in grid 630 because image 1 would not fill the entire first row, e.g., it would leave two empty cells in its row. The other non-highlighted images shown in FIG. 6C can be placed in the sort order and grid direction in additional rows (not shown) of grid 630 following the third row.

Figure 6F:
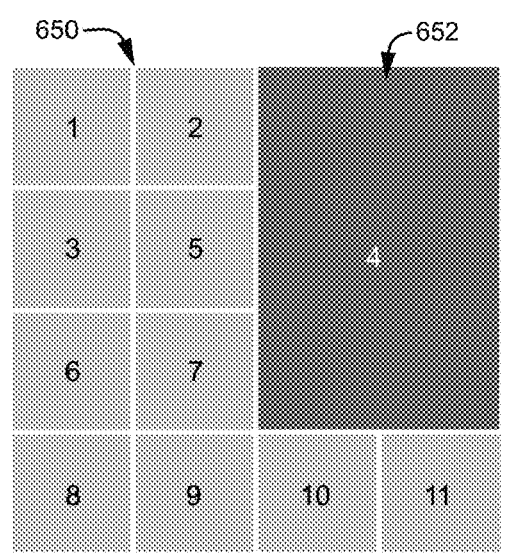

FIGS. 6E and 6F illustrate additional examples of a plurality of images arranged in a layout, without displaying highlighted images and displaying one of the images as a highlight image, respectively. In FIG. 6E, a grid 640 is shown that includes a plurality of images (numbered 1 through 16) in a 4×4 layout of square cells and none of the images displayed as highlighted images. An image 642 (numbered 4, in darker shade) has been determined to be a designated image in the subset of images, and is to be displayed as a highlighted image. Based on the image's actual aspect ratio (a portrait orientation which is not shown in grid 640), a 2×3 configuration of cells is determined, where the image is to be placed across 2 columns and 3 rows of the grid 640.

FIG. 6F illustrates an example display of the plurality of images of FIG. 6E arranged in a display layout with one of the images displayed as a highlighted image. A grid 650 includes a highlighted image 652 (numbered 4, in darker shade) that has been placed across 2 columns and 4 rows of the grid 650. To determine the six cells to be occupied by the image 652, the image 642 of FIG. 6E was attempted to be extended in the grid direction of right-then-down. However, the next subsequent cell would be to the right of image 4 in FIG. 6E and would be outside the grid, so the next subsequent cell is selected to the left of the image 4, e.g., the cell corresponding to image 3 in FIG. 6E. The next subsequent cells of the highlighted image extend to the next two rows down into the cells corresponding to images 7 and 8, and images 11 and 12, respectively, in FIG. 6E.

After determining the placement of the cells for the highlighted image, the image 652 is placed over those cells (modified, e.g., cropped, to fit if necessary) and is displayed in the grid 650. In addition, the placement of the non-highlighted images of FIG. 6E is determined. Images 1, 2, and 3 were previously placed in the grid 650 (similarly as in FIG. 6E), but the cell of image 3 was occupied by highlighted image 652 (image 4). Therefore, image 3 is rearranged in the grid 650 by placing it in the next available cell after image 4 has been placed, which is the second row, first column. In this example, the remaining images 5-11 are placed (e.g., after image 652 has been placed) in the next available cells according to sort order and the grid direction (right-then-down), avoiding showing empty cells. The available cells are positioned around the highlighted image 652, e.g., to the left of highlighted image 652 in the second and third rows. The highlighted image 652, image 4, is positioned out of sort order due to being positioned in the last two columns of grid 650. The other non-highlighted images shown in FIG. 6E can be placed in the sort order and grid direction in additional rows (not shown) of grid 650 following the fourth row.

FIG. 7A illustrates an example display of a plurality of images arranged in a display layout and including a hanging highlighted image. In FIG. 7A, a grid 700 includes a plurality of images (numbered 1 through 10). An image 702 (numbered 10, in darker shade) is a highlighted image that is placed across 2 columns and 3 rows of the grid 700. The plurality of images in the grid shown in FIG. 7A are placed in the grid direction, e.g., the right-then-down direction, in the sort order of the images labeled 1 through 10. As seen in FIG. 7A, the image 702 has 2 empty cells 704 on its left and 3 empty cells 706 on its right (the empty cells are shown in dashed lines for clarity; the dashed lines need not be actually displayed in the grid). Image 702 is therefore a hanging highlighted image. This can occur, for example, if a highlighted image is on the last row of a set of images in a grid.

FIG. 7B illustrates an example display of the plurality of images of FIG. 7A arranged in a display layout after one example of adjustment for the hanging highlighted image according to one or more features described herein. The image 712 is a highlighted image that is placed in the grid 710 in a manner that reduces the number of empty cells that are adjacent to the image 712 compared to the grid layout of FIG. 7A. In the example of FIG. 7B, the image 712 has been moved one cell upward as compared to the hanging image 702 of FIG. 7A. The adjustment to the placement of the highlighted image 712 causes the plurality of non-highlighted images in the grid shown in FIG. 7B to be rearranged around the highlighted image 712, in a sort order and grid direction (right-then-down). In this example, this causes the images of grid 710 to be positioned out of the sort order, due to image 712 being placed between other images (e.g., image 10 appears to the left of image 6 and image 8). As seen in FIG. 7B, a single empty cell 714 adjoins the image 712 (shown in dashed lines for clarity; the dashed lines need not be actually displayed in the grid), compared to the 5 empty cells adjoining the hanging highlighted image 702 of FIG. 7A.

Figure 8A:
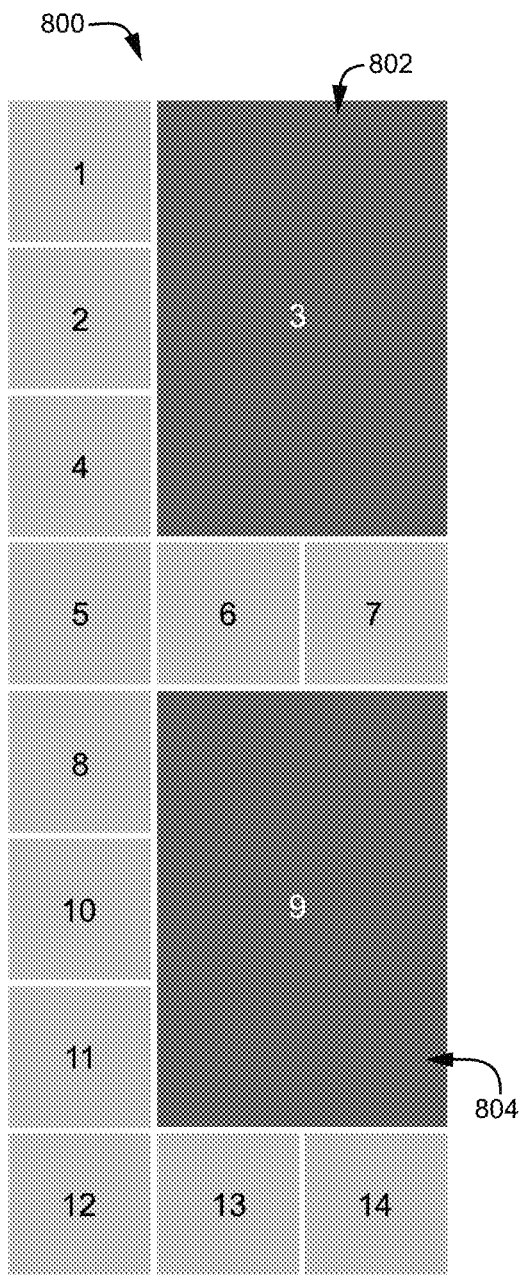
FIG. 8A illustrates an example display of a plurality of images arranged in a display layout and including multiple highlighted images.

FIG. 8A illustrates an example display of a plurality of images arranged in a display layout and including multiple highlighted images. In this example, a grid 800 includes a plurality of images (numbered 1 through 10) arranged in a display layout and including two highlighted images 802 (image 3) and 804 (image 9) in a darker shade. The plurality of images in the grid shown in FIG. 8A are placed in the grid direction. Both highlighted image 802 and highlighted image 804 are placed across 2 columns and 3 rows of the grid 800, and both images 802 and 804 are placed against the right border of the grid 800.

In some implementations, this uniformity of placement may be undesired, e.g., as decreasing the distinctiveness or prominence of the highlighted images in the display layout. The system can check for one or more diversity positioning criteria that indicate that one or more of the highlight images can be moved to create more positional diversity. In some examples, the system can detect whether multiple highlighted images are within a threshold distance of each other (e.g., adjacent or within two cell lengths of each other), and whether those highlighted images occupy the same columns and/or are positioned against the same grid border. In this example, the system has determined that the highlighted images are within the threshold distance of two cells and that both highlighted images are positioned against the right border of the grid.

Figure 8B:
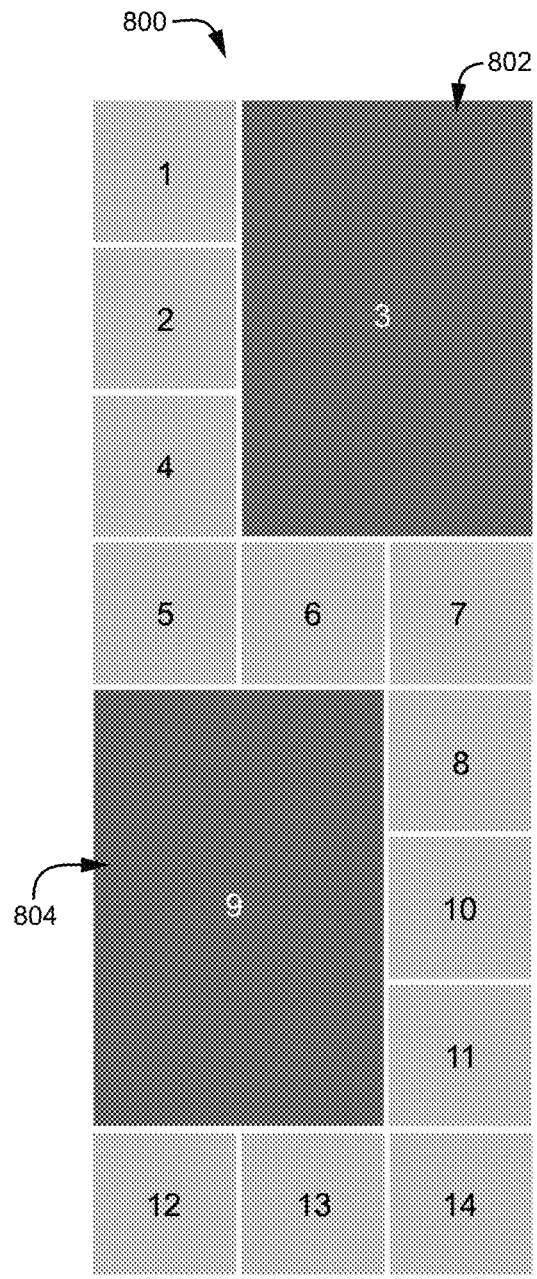
FIG. 8B illustrates an example display of the plurality of images of FIG. 8A arranged in a display layout and including a moved highlighted image.

FIG. 8B illustrates an example display of the plurality of images of FIG. 8A arranged in a display layout and including a moved highlighted image. In this example, grid 800 includes the plurality of images (numbered 1 through 10) of FIG. 8A, including the two highlighted images 802 (image 3) and 804 (image 9) in a darker shade. Since the system has detected that the highlighted images 802 and 804 meet the diversity positioning criteria, image 804 is moved, e.g., shifted, one cell to the left. This causes the highlighted images to be presented in a more staggered manner. After image 804 is moved, the other, non-highlighted images are rearranged in sort order and in the grid direction to fill the empty cells available after the image 804 was moved.

Figure 9:
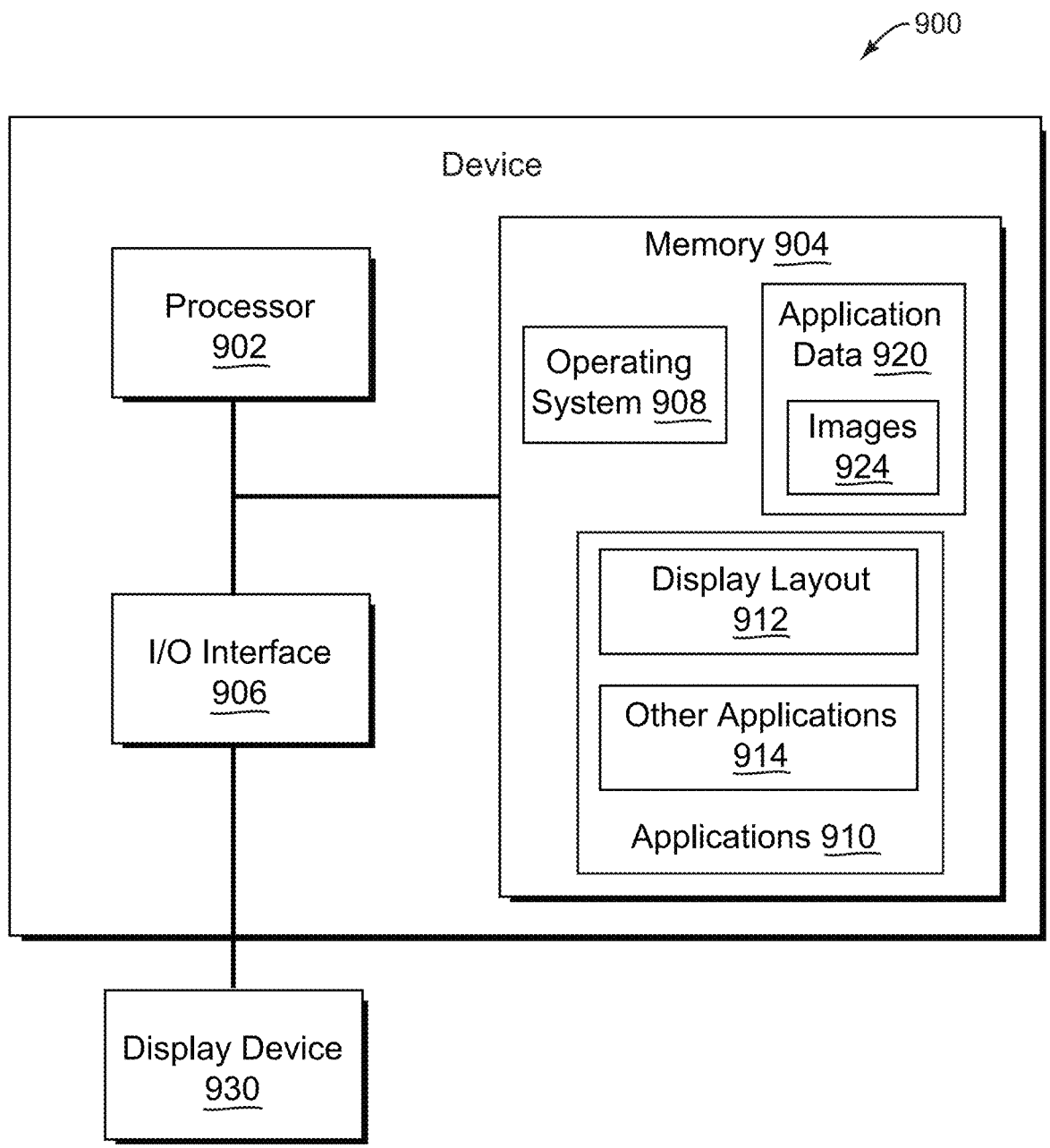
FIG. 9 is a block diagram of an example device which may be used for one or more implementations described herein.

FIG. 9 is a block diagram of an example device 900 which may be used to implement one or more features described herein. In one example, device 900 may be used to implement a computer device, e.g., a server device (e.g., server device 104 of FIG. 1), and perform appropriate method implementations described herein. Device 900 can be any suitable computer system, server, or other electronic or hardware device. For example, the device 900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 900 includes a processor 902, a memory 904, and input/output (I/O) interface 906.

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, one or more applications 910, e.g., a graphics editing engine, web hosting engine, social networking engine, etc. and application data 920. In some implementations, applications 910 can include instructions that enable processor 902 to perform the functions described herein, e.g., some or all of the methods of FIGS. 2 and 5.

For example, applications 910 can include a display layout application 912, which as described herein can provide image viewing functions, e.g., displaying images in a display layout (such as a grid, etc.) that includes one or more highlighted images. Other applications or engines 914 can also or alternatively be included in applications 910, e.g., email applications, SMS and other phone communication applications, web browser applications, media display applications, communication applications, web hosting engine or application, social networking engine or application, etc. One or more such applications can use one or more features described herein to display images, e.g., in a selection interface, menu, etc. Any of software in memory 904 can alternatively be stored on any other suitable storage location or computer-readable medium. In addition, memory 904 (and/or other connected storage device(s)) can store images, shared album data, sharing models, cell configurations and aspect ratio associations, user data and preferences, and other instructions and data used in the features described herein. Memory 904 and any other type of storage (magnetic disk, optical disk, magnetic tape, or other tangible media) can be considered "storage" or "storage devices."

For example, application data 920 can include one or more images 924. Images 924 can include a plurality of images and associated metadata. In some examples, device 900 can be a client device, and images 924 can be images captured by a camera of the client device (not shown). In another example, device 900 is a server device, and images 924 can be images stored at the server (e.g., uploaded to the server from client device). In some implementations, image metadata may be stored along with, or separately from images 924.

I/O interface 906 can provide functions to enable interfacing the server device 900 with other systems and devices. For example, network communication devices, storage devices (e.g., memory and/or database 106), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.). Display device 930 is one example of an output device that can be used to display content, e.g., one or more images provided in a display layout (e.g., grid), image sharing interface, or other application as described herein. Display device 930 can be connected to device 900 via local connections (e.g., display bus) and/or via networked connections and can be any suitable display device, some examples of which are described below.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

Device 900 can be a client device to implement and/or be used with features described herein, e.g., client devices 120-126 shown in FIG. 1. Example client devices can be computer devices including some similar components as the device 900, e.g., processor(s) 902, memory 904, and I/O interface 906. An operating system, software and applications suitable for the client device can be provided in memory and used by the processor, e.g., image management software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 930, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that outputs speech or other audio.

One or more methods described herein (e.g., methods 300, 400, and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   identifying a plurality of images, wherein each image of the plurality of images has a respective importance score;
   selecting a subset of the plurality of images based at least in part on the respective importance score for each image, wherein the subset includes at least one image of the plurality of images;
   determining that two or more of the plurality of images are linked images;
   determining that the subset of the plurality of images includes a first linked image and excludes a second linked image of the linked images;
   adding the second linked image to the subset in response to determining that the subset includes the first linked image and excludes the second linked image;
   determining a display layout for the plurality of images, wherein the display layout includes a plurality of cells arranged in a grid and wherein the at least one image of the subset of the plurality of images occupies at least two cells in the display layout, wherein determining the display layout comprises inserting the plurality of images in the grid, wherein the inserting comprises:
      selecting a particular image from the plurality of images;
      selecting a particular cell from the plurality of cells in the grid;
      determining whether the particular image is in the subset of the plurality of images;
      in response to determining that the particular image is not in the subset of the plurality of images, placing the particular image in the particular cell as a single-cell image; and
      in response to determining that the particular image is in the subset of the plurality of images, placing the particular image as a multiple-cell image, including:
         determining an aspect ratio of the particular image, wherein a first dimension of the particular image is larger than a second dimension of the particular image;
         in response to determining the aspect ratio of the particular image, determining one or more subsequent cells from the plurality of cells in the grid to place the particular image based at least in part on the aspect ratio, wherein the particular cell and the one or more subsequent cells include an amount of cells in a first direction of the grid that corresponds to the first dimension that is greater than an amount of cells in a second direction of the grid that corresponds to the second dimension; and placing the particular image to occupy the particular cell and the one or more subsequent cells; and causing the plurality of images to be displayed in a user interface on a display screen based on the grid.

2. The computer-implemented method of claim 1, further comprising:

determining whether at least one image of the subset is hanging, wherein the at least one image of the subset is hanging when positioned in a last row of the grid and is displayed having an extended portion positioned beyond the last row of the grid with no images positioned adjacent to the extended portion; and in response to determining that the at least one image of the subset is hanging, removing the at least one image from the subset.

3. The computer-implemented method of claim 1, further comprising:

in response to determining that the particular image is in the subset of the plurality of images:

determining whether at least one cell adjacent in the grid to the particular cell includes a previously-placed multiple-cell image that occupies more than one cell in the display layout; and in response to determining that there is at least one cell adjacent in the grid to the particular cell that includes the previously-placed multiple-cell image, placing the particular image in the particular cell as the single-cell image, wherein the placing the particular image as the multiple-cell image to occupy the particular cell and the one or more subsequent cells is performed in response to determining that there is no cell adjacent to the particular cell that includes the previously-placed multiple-cell image.

4. The computer-implemented method of claim 1, wherein determining the one or more subsequent cells further comprises:

determining a type of the particular image, wherein the type is one of: landscape image, portrait image, horizontal panorama, or vertical panorama; and selecting cells adjacent to the particular cell in a m×n pattern, wherein:

in response to determining that the type of the particular image is landscape image or horizontal panorama, m is greater than n, and in response to determining that the type of the particular image is the portrait image or the vertical panorama, m is less than n, wherein m is a number of columns in a horizontal direction along the grid and n is a number of rows in a vertical direction along the grid.

5. The computer-implemented method of claim 1, wherein the grid includes a plurality of columns and wherein each of the plurality of cells is square-shaped, and further comprising, prior to causing the plurality of images to be displayed:

cropping the plurality of images, wherein the cropping comprises, for each image of the plurality of images, cropping the image based on the aspect ratio of the image.

6. The computer-implemented method of claim 1, wherein the respective importance score for each image is based upon one or more of: one or more visual characteristics of the image, or prior user interaction with the image, and wherein selecting the subset of the plurality of images comprises:

determining, for each image of the plurality of images, whether the respective importance score of the image meets an importance threshold; and if the respective importance score of the image meets the importance threshold, adding the image to the subset.

7. The computer-implemented method of claim 1, further comprising:

rearranging, using at least one processor and without user input, one or more previously-placed images in the grid after placement of the particular image, wherein the rearranging includes placing the one or more previously-placed images in a grid direction and in a sort order in cells of the grid available after the placement of the particular image;

determining whether the placing of the one or more previously-placed images in the grid direction and in the sort order in cells of the grid exceeds an out-of-order limit, wherein the out-of-order limit indicates a maximum number of cell positions that each of the one or more previously-placed images are to be moved for the rearranging with respect to a previous position in the sort order; and in response to determining that placing of at least one previously-placed image of the one or more previously-placed images exceeds the out-of-order limit, excluding the placing of the at least one previously-placed image in the grid direction and in the sort order.

8. The computer-implemented method of claim 1, wherein the respective importance score for each image is based upon one or more of: a number of faces in the image, whether a face over a threshold size is depicted in the image, an amount of images in the plurality of images determined to have a time of capture occurring within a predetermined time interval, or an amount of images in the plurality of images determined to have a location of capture within a predetermined distance of one or more locations.

9. A device comprising:

a memory with instructions stored thereon; and at least one processor configured to access the instructions stored in the memory, that when executed by the at least one processor cause the at least one processor to perform operations comprising:

identifying a plurality of images, wherein each image of the plurality of images has a respective importance score;

determining that two or more of the plurality of images are linked images;

selecting a subset of the plurality of images based at least in part on the respective importance score for each image, wherein the subset includes at least one image of the plurality of images;

after selecting the subset of the plurality of images, determining that the subset includes a first linked image of the linked images and excludes a second linked image of the linked images, and adding the second linked image to the subset;

determining a display layout for the plurality of images, wherein the display layout includes a plurality of cells arranged in a grid and wherein the at least one image of the subset of the plurality of images occupies at least two cells in the display layout, wherein determining the display layout comprises inserting the plurality of images in the grid, wherein the inserting comprises:

selecting a particular image from the plurality of images;

selecting a particular cell from the plurality of cells in the grid;

determining whether the particular image is in the subset of the plurality of images;

in response to determining that the particular image is not in the subset of the plurality of images, placing the particular image in the particular cell as a single-cell image in the grid; and in response to determining that the particular image is in the subset of the plurality of images, placing the particular image as a multiple-cell image in the grid, including:

determining an aspect ratio of the particular image, wherein a first dimension of the particular image is larger than a second dimension of the particular image;

in response to determining the aspect ratio of the particular image, determining one or more subsequent cells from the plurality of cells in the grid to place the particular image based at least in part on the aspect ratio, wherein the particular cell and the one or more subsequent cells include an amount of cells in a first direction of the grid that corresponds to the first dimension that is greater than an amount of cells in a second direction of the grid that corresponds to the second dimension; and placing the particular image to occupy the particular cell and the one or more subsequent cells; and causing the plurality of images to be displayed in a user interface on a display device based on the display layout.

10. The device of claim 9, wherein the operation of placing the particular image includes, in response to the particular image being one of the linked images, placing the particular image at least a minimum display distance in the grid from other images of the linked images.

11. The device of claim 9, wherein the at least one processor is further configured to perform operations comprising:

determining whether at least one image of the subset is hanging, wherein the at least one image of the subset is hanging in response to being positioned in a last row of the grid and is displayed having an extended portion positioned beyond the last row of the grid with no images positioned adjacent to the extended portion; and in response to determining that the at least one image of the subset is hanging, removing the at least one image from the subset.

12. The device of claim 9, wherein the at least one processor is further configured to perform operations comprising:

in response to determining that the particular image is in the subset of the plurality of images:

determining whether at least one cell adjacent in the grid to the particular cell includes a previously-placed multiple-cell image that occupies more than one cell in the display layout; and in response to determining that there is at least one cell adjacent in the grid to the particular cell that includes the previously-placed multiple-cell image, placing the particular image in the particular cell as the single-cell image, wherein the placing the particular image as the multiple-cell image to occupy the particular cell and the one or more subsequent cells is performed in response to determining that there is no cell adjacent to the particular cell that includes the previously-placed multiple-cell image.

13. The device of claim 9, wherein the operation of determining the one or more subsequent cells further comprises:

determining a type of the particular image, wherein the type is one of: landscape image, portrait image, horizontal panorama, or vertical panorama; and selecting cells adjacent to the particular cell in a m×n pattern, wherein:

in response to determining that the type of the particular image is landscape image or horizontal panorama, m is greater than n, and in response to determining that the type of the particular image is the portrait image or the vertical panorama, m is less than n, wherein m is a number of columns in a horizontal direction along the grid and n is a number of rows in a vertical direction along the grid.

14. The device of claim 9, wherein the grid includes a plurality of columns and wherein each of the plurality of cells is square-shaped, and wherein the at least one processor is further configured to perform operations comprising, prior to causing the plurality of images to be displayed:

cropping the plurality of images, wherein the cropping comprises, for each image of the plurality of images:

cropping the image based on an aspect ratio of the image.

15. The device of claim 9, wherein the respective importance score for each image is based upon one or more of: a number of faces in the image, or whether a face over a threshold size is depicted in the image.

16. A non-transitory computer readable medium having stored thereon software instructions that, when executed by a processor, cause the processor to perform operations including:

identifying a plurality of images, wherein each image of the plurality of images has a respective importance score;

selecting a subset of the plurality of images based at least in part on the respective importance score for each image, wherein the subset includes at least one image of the plurality of images;

determining a display layout for the plurality of images, wherein the display layout includes a plurality of cells arranged in a grid and wherein the at least one image of the subset of the plurality of images occupies at least two cells in the display layout, wherein determining the display layout comprises inserting the plurality of images in the grid, wherein the inserting comprises:

selecting a particular image from the plurality of images;

selecting a particular cell from the plurality of cells in the grid;

determining whether the particular image is in the subset of the plurality of images;

in response to determining that the particular image is not in the subset of the plurality of images, placing the particular image in the particular cell as a single-cell image; and in response to determining that the particular image is in the subset of the plurality of images, placing the particular image as a multiple-cell image, including:
  determining an aspect ratio of the particular image, wherein a first dimension of the particular image is larger than a second dimension of the particular image;
  in response to determining the aspect ratio of the particular image, determining one or more subsequent cells from the plurality of cells in the grid to place the particular image based at least in part on the aspect ratio, wherein the particular cell and the one or more subsequent cells include an amount of cells in a first direction of the grid that corresponds to the first dimension that is greater than an amount of cells in a second direction of the grid that corresponds to the second dimension; and
  placing the particular image to occupy the particular cell and the one or more subsequent cells;

rearranging, without user input, one or more previously-placed images in the grid after placement of the particular image, wherein the rearranging includes placing the one or more previously-placed images in a grid direction and in a sort order in cells of the grid available after the placement of the particular image;

determining whether the placing of the one or more previously-placed images in the grid direction and in the sort order in cells of the grid exceeds an out-of-order limit, wherein the out-of-order limit indicates a maximum number of cell positions that each of the one or more previously-placed images are to be moved for the rearranging with respect to a previous position in the sort order; and in response to determining that placing of at least one previously-placed image of the one or more previously-placed images exceeds the out-of-order limit, excluding the placing of the at least one previously-placed image in the grid direction and in the sort order; and causing the plurality of images to be displayed in a user interface on a display screen based on the grid.

17. The non-transitory computer readable medium of claim 16, where the operations further comprise:
  determining that two or more of the plurality of images are linked images;
  determining that the subset of the plurality of images includes a first linked image and excludes a second linked image of the linked images; and
  adding the second linked image to the subset in response to determining that the subset includes the first linked image and excludes the second linked image.

18. The non-transitory computer readable medium of claim 16, wherein the operations further comprise:
  determining whether at least one image of the subset is hanging, wherein the at least one image of the subset is hanging when positioned in a last row of the grid and is displayed having an extended portion positioned beyond the last row of the grid with no images positioned adjacent to the extended portion; and
  in response to determining that the at least one image of the subset is hanging, removing the at least one image from the subset.

19. The non-transitory computer readable medium of claim 16, wherein determining the one or more subsequent cells further comprises:
  determining a type of the particular image, wherein the type is one of: landscape image, portrait image, horizontal panorama, or vertical panorama; and
  selecting cells adjacent to the particular cell in a m×n pattern, wherein:
    in response to determining that the type of the particular image is landscape image or horizontal panorama, m is greater than n, and
    in response to determining that the type of the particular image is the portrait image or the vertical panorama, m is less than n,
  wherein m is a number of columns in a horizontal direction along the grid and n is a number of rows in a vertical direction along the grid.

* * * * *